(12) United States Patent
Lu et al.

(10) Patent No.: US 12,166,875 B2
(45) Date of Patent: Dec. 10, 2024

(54) WORKING METHOD FOR KEY DEVICE AND KEY DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 339 days.

(21) Appl. No.: 17/773,687

(22) PCT Filed: Sep. 9, 2021

(86) PCT No.: PCT/CN2021/117509
§ 371 (c)(1),
(2) Date: May 2, 2022

(87) PCT Pub. No.: WO2022/142456
PCT Pub. Date: Jul. 7, 2022

(65) Prior Publication Data
US 2023/0163965 A1 May 25, 2023

(30) Foreign Application Priority Data
Dec. 28, 2020 (CN) .......................... 202011572632.7

(51) Int. Cl.
*H04L 9/08* (2006.01)
*H04L 9/06* (2006.01)
*H04L 9/32* (2006.01)

(52) U.S. Cl.
CPC .......... *H04L 9/0894* (2013.01); *H04L 9/0618* (2013.01); *H04L 9/3242* (2013.01)

(58) Field of Classification Search
CPC .... H04L 9/0894; H04L 9/0618; H04L 9/3242
(Continued)

(56) References Cited

U.S. PATENT DOCUMENTS 10,454,674 B1 * 10/2019 Bar-El ................ H04L 63/123
10,685,350 B2 * 6/2020 Osborn ................ H04L 9/3234
(Continued)

FOREIGN PATENT DOCUMENTS

CN 105721480 A 6/2016
CN 107919963 A 4/2018
(Continued)

OTHER PUBLICATIONS

International Search Report and Written Opinion mailed Nov. 25, 2021, in corresponding to International Application No. PCT/CN2021/117509; 10 pages.
(Continued)

*Primary Examiner* — Kambiz Zand
*Assistant Examiner* — Phuc Pham
(74) *Attorney, Agent, or Firm* — Maier & Maier, PLLC

(57) ABSTRACT

A working method for a key device and a key device, including: a smart key apparatus receives an authentication instruction, determines a type of the authentication instruction, parses a FIDO2 authentication instruction to obtain a credential if the instruction is the FIDO2 authentication instruction, checks whether the credential is complete by using a changing key corresponding to the FIDO2, if a check is successful, the credential is registered in a FIDO2 mode, and the authentication response is generated and returned to the client; and if the check fails, whether the credential is complete is checked by using the changing key corresponding to a U2F, and the credential is registered in a U2F mode if a check is successful, the authentication response is generated and returned to the client, and an error response is returned to the client if the check fails.

19 Claims, 18 Drawing Sheets

(58) Field of Classification Search
USPC .......................................................... 380/286
See application file for complete search history.

(56) References Cited

U.S. PATENT DOCUMENTS

| | | | | |
|---|---|---|---|---|
| 2018/0227128 | A1* | 8/2018 | Church | ................. H04L 9/3247 |
| 2019/0124081 | A1* | 4/2019 | Nowak | ............... H04L 63/0892 |
| 2020/0162246 | A1* | 5/2020 | Schouppe | ............... H04L 9/085 |
| 2020/0374124 | A1* | 11/2020 | Bahloul | ................. H04L 9/3231 |

FOREIGN PATENT DOCUMENTS

| | | |
|---|---|---|
| CN | 108092776 A | 5/2018 |
| CN | 109088902 A | 12/2018 |
| CN | 111414608 A | 7/2020 |
| CN | 112311558 A | 2/2021 |

OTHER PUBLICATIONS

First Office Action issued Feb. 10, 2021, corresponding to Chinese Application No. 202011572632.7; 9 pages (with English Translation).

Notification to Grant Patent Right for Invention issued Mar. 1, 2021, corresponding to Chinese Application No. 202011572632.7; 4 pages (with English Translation).

\* cited by examiner

WORKING METHOD FOR KEY DEVICE AND KEY DEVICE

CROSS-REFERENCE TO RELATED APPLICATIONS

This application is a national stage of International Application No. PCT/CN2021/117509, filed on Sep. 9, 2021, which claims priority to Chinese Patent Application No. 202011572632.7, filed to the China National Intellectual Property Administration on Dec. 28, 2020 and entitled "Working Method for Key Device and Key Device". Both of the aforementioned applications are hereby incorporated by reference in their entireties.

TECHNICAL FIELD

The present application relates to a working method for a key device and a key device, which belongs to the field of information security.

BACKGROUND

FIDO (Fast Identity Online) coalition is an identity authentication biological system on the basis of a standard and interoperability. FIDO2 is a general term for a latest set of specifications of the FIDO coalition. FIDO2 enables users to easily verify an online service by using a common device in mobile or table environment. U2F (Universal $2^{nd}$ Factor) is a stronger identity authentication protocol, which is presented by the FIDO coalition, by using a standard public key password technology. At the moment, the U2F and the FIDO2 can apply to each other in an applet, which means that one applet can support both U2F and FIDO2 functions, however, the register and authentication of the two are apart from each other. That is, performing a registration by using the FIDO2 requires performing an authentication by using same. And performing a registration by using the U2F requires performing an authentication by using same. If the users use the FIDO2, communication with each other cannot be achieved, causing inconvenience to the users.

SUMMARY

According to one aspect of the present application, provided is a working method of a key device, including:
  step s1, waiting, by the key device, for receiving an authentication instruction, and determining a type of the authentication instruction when receiving the authentication instruction, executing step s2 if the authentication instruction is a FIDO2 authentication instruction; and executing step s7 if the authentication instruction is a U2F authentication instruction;
  step s2, parsing, by the key device, the FIDO2 authentication instruction to obtain a current credential, obtaining a changing key, which is stored in the key device, corresponding to a FIDO2, checking whether the current credential is complete according to the changing key corresponding to the FIDO2, if a check is successful, the current credential is registered in a FIDO2 mode and executing step s3; otherwise, executing step s4;
  step s3, decrypting, by the key device, the current credential by using a decrypting key corresponding to the FIDO2 to obtain a user private key and a preset flag bit, determining whether a protecting level of the current credential meets the preset condition according to the preset flag bit, when yes, executing step s6; otherwise, returning an error response to a client and exiting;
  step s4, obtaining, by the key device, a changing key, which is stored by the key device, corresponding to the U2F, checking whether the current credential is complete according to the changing key corresponding to the U2F, the current credential is registered by using U2F registration mode and executing step s5 when a check is successful; otherwise, returning an error response to the client and exiting;
  step s5, decrypting, by the key device, the current credential by using a decrypting key corresponding to the U2F to obtain a user private key and a preset flag bit, determining whether the protecting level of the current credential meets the preset condition according to the preset flag bit, when yes, executing step s6; otherwise, returning an error response to the client and exiting;
  step s6, generating, by the key device, an authentication response according to the current credential, the user private key and the FIDO2 authentication instruction, returning the authentication response to the client, and returning to step s1;
  step s7, parsing, by the key device, the U2F authentication instruction to obtain a key handle, obtaining the changing key, which is stored by the key device, corresponding to the U2F, checking whether the key handle is complete according to the changing key corresponding to the U2F, the key handle is registered by using a U2F mode and executing step s8 when a check is successful; otherwise, executing step s9;
  step s8, decrypting, by the key device, the key handle by using the decrypting key corresponding to the U2F to obtain the user private key, and executing step s11;
  step s9, obtaining, by the key device, the changing key, which is stored by the key device, corresponding to the FIDO2, checking whether the key handle is complete according to the changing key corresponding to the FIDO2, when a check is successful, the key handle is registered by using a FIDO2 mode, and executing step s10; when a check fails, returning an error response to the client and exiting;
  step s10, decrypting, by the key device, the key handle by using the decrypting key corresponding to the FIDO2 to obtain the user private key and the preset flag bit, determining whether a protecting level of the key handle meets the preset condition according to the preset flag bit, when yes, executing step s11; otherwise, returning an error response to the client and exiting; and
  step s11, generating, by the key device, the authentication response according to the U2F authentication instruction and the user private key, returning the authentication response to the client, and returning to step s1.

Optionally, the parsing, by the key device, the FIDO2 authentication instruction to obtain the current credential in step s2 is specifically that: parsing, by the key device, the FIDO2 authentication instruction to obtain an allow list, a relying party identification, and a client parameter; and parsing the permit name list to obtain the current credential.

Optionally, step s3 is specifically that:
  step s3-1, decrypting, by the key device, the current credential by using the decrypting key corresponding to the FIDO2 to obtain a user private key intermediate value, a chip identification plaintext, a relying party hash result plaintext and an extension parameter flag bit;

step s3-2, determining, by the key device, whether the protecting level of the current credential meets the preset condition according to the extension parameter flag bit, when yes, executing step s3-3; otherwise, returning an error response to the client and exiting; and step s3-3, performing, by the key device, a preset operation on the user private key intermediate value to obtain the user private key, and executing step s6.

Optionally, the preset operation in step s3-3 is an inverse operation.

Optionally, step s5 specifically includes:

step s5-1, decrypting, by the key device, the current credential by using the decrypting key corresponding to the U2F to obtain a user private key intermediate value, a chip identification plaintext, a relying party identification hash and an extension parameter flag bit;

step s5-2, determining, by the key device, whether the protecting level of the current credential meets the preset condition according to the extension parameter flag bit, when yes, executing step s5-3; otherwise, returning an error response to the client and exiting; and step s5-3, performing, by the key device, a preset operation on the user private key intermediate value to obtain the user private key.

Optionally, the preset operation in step s5-3 is an inverse operation.

Optionally, step s8 specifically includes:

step s8-1, decrypting, by the key device, the key handle by using the decrypting key corresponding to the U2F to obtain a user private key intermediate value, a chip identification plaintext and a second applet parameter; and step s8-2, operating, by the key device, the preset operation on the user private key intermediate value to obtain the user private key, and executing step s11.

Optionally, the preset operation in step s8-2 is the inverse operation.

Optionally, step s11 is specifically that:

organizing, by the key device, signature data according to a random parameter and an applet parameter, signing on the signature data by using the user private key to obtain a signature result, and generating the authentication response according to the signature result and the U2F authentication instruction, and returning the authentication response to the client.

According to another aspect of the present application, provided is a key device, including:

a receiving module, configured to receive an authentication instruction;

a determining module, configured to determine a type of the authentication instruction when the receiving module receives the authentication instruction;

a parsing module, configured to parse the FIDO2 authentication instruction to obtain a current credential when the determining module determines that the authentication instruction is the FIDO2 authentication instruction;

a checking module, configured to obtain a changing key, which is stored by the key device, corresponding to the FIDO2, and check whether the current credential which is obtained through the parsing module parsing the FIDO2 authentication instruction is complete according to the changing key corresponding to the FIDO2;

a decrypting module, configured to decrypt the current credential by using the decrypting key corresponding to the FIDO2 to obtain a user private key and a preset flag bit when the checking module checks the current credential is complete;

the determining module is further configured to determine whether a protecting level of the current credential meets a preset condition according to the preset flag bit obtained by the decrypting module, when yes, trigger a generating module; otherwise, trigger a returning module;

the returning module is configured to return an error response to a client when the determining module determines that the protecting level of the current credential does not meet the preset condition;

an obtaining module, configured to obtain a changing key, which is stored by the key device, corresponding to a U2F;

the checking module is further configured to check whether the current credential is complete according to a changing key corresponding to the U2F when the obtaining module obtains the changing key corresponding to the U2F; trigger the decrypting module when a check is successful; and trigger the returning module when the check fails;

the returning module is further configured to return an error response to the client when the checking module checks the current credential is not complete according to the changing key corresponding to the U2F;

the decrypting module is further configured to decrypt the current credential by using the decrypting key corresponding to the U2F to obtain the user private key and the preset flag bit when the checking module checks that the current credential is complete according to the changing key corresponding to the U2F;

the determining module is further configured to determine whether the protecting level of the current credential meets the preset condition according to the preset flag bit which is obtained through the decrypting module decrypting the current credential by using the decrypting key corresponding to the U2F, when yes, trigger the generating module; otherwise, trigger the returning module;

the generating module, configured to generate authentication response according to the current credential, the private key and the FIDO2 authentication instruction, and trigger the returning module;

the returning module is further configured to return the authentication response generated by the generating module to the client;

the parsing module is further configured to parse the U2F authentication instruction to obtain a key handle;

the obtaining module is further configured to obtain the changing key, which is stored by the key device, corresponding to the U2F;

the checking module is further configured to check whether the key handle is complete according to the changing key, which is stored by the key device and obtained by the obtaining module, corresponding to the U2F, when a check is successful, trigger the decrypting module; and when the check fails, trigger the obtaining module;

the decrypting module is further configured to decrypt the key handle by using the decrypting key corresponding to the U2F to obtain the user private key and trigger the generating module;

the obtaining module is further configured to obtain the changing key, which is stored by the key device, corresponding to the FIDO2;

the checking module is further configured to check whether the key handle is complete according to the changing key, which is obtained by the obtaining module and stored by the key device, corresponding to the FIDO2, when a check is successful, trigger the decrypting module; when the check fails, trigger the returning module;

the decrypting module is further configured to decrypt the key handle by using the decrypting key corresponding to the FIDO2 to obtain the user private key and the preset flag bit;

the determining module is further configured to determine whether the protecting level of the key handle meets the preset condition according to the preset flag which is obtained by the decrypting module decrypting the key handle by using the decrypting key corresponding to the FIDO2, when yes, trigger the generating module; otherwise, trigger the returning module; and the generating module is further configured to generate the authentication response according to the U2F authentication instruction and the user private key.

Optionally, the key device further includes that: the decrypting module is specifically configured to parse FIDO2 authentication instruction to obtain a white list, a relaying party identification, and a client parameter; and is further configured to parse the white list to obtain the current credential.

Optionally, the key device further includes an operating module;

the decrypting module is configured to decrypt the current credential by using the decrypting key corresponding to the FIDO2 to obtain the user private key and the preset flag bit when the checking module checks the current credential is complete; specifically, the decrypting module uses the decrypting key corresponding to the FIDO2 to decrypt the current credential to obtain a user private key intermediate value, a chip identification plaintext, a relying party hash result and an extension parameter flag bit;

the determining module is configured to determine whether the protecting level of the current credential meets the preset condition according to the preset flag bit obtained by the decrypting module; when yes, trigger the operating module; otherwise, trigger the returning module; specifically, the determining module determines whether the protecting level of the current credential meets the preset condition according to the extension parameter flag bit obtained by the decrypting module, when yes, trigger the operating module; otherwise, trigger the returning module; and the operating module is configured to perform a preset operation on the private key intermediate value to obtain the user private key.

Optionally, the operating module is specifically configured to perform an inversion operation on the user private key intermediate value.

Optionally, the key device further includes an operating module;

the decrypting module is further configured to decrypt the current credential to obtain the user private key and the preset flag bit by using the decrypting key corresponding to the U2F when the checking module checks the current credential is complete according to the changing key corresponding to the U2F, specifically, the decrypting module is configured to decrypt the current credential by using the decrypting key corresponding to the U2F to obtain a user private key intermediate value, a chip identification plaintext, a relying party identification hash and an extension parameter flag bit;

the determining module is further specifically configured to determine whether the protecting level of the current credential meets the preset condition according to the extension parameter flag bit obtained by the decrypting module, when yes, trigger the operating module; otherwise, trigger the returning module;

the returning module is configured to return an error response to the client when the determining module determines that the protecting level of the current credential does not meet the preset condition; and the operating module is further configured to perform a preset operation on the private key intermediate value to obtain the user private key.

Optionally, the operating module is specifically configured to perform an inversion operation on the private key intermediate value to obtain the user private key.

Optionally, the decrypting module is further configured to decrypt the key handle by using the decrypting key corresponding to the U2F to obtain the user private key, specifically, decrypt the key handle by using the decrypting key corresponding to the U2F to obtain a user private key intermediate value, a chip identification plaintext and a second applet parameter; and the operating module is further configured to perform a preset operation on the private key intermediate value to obtain the user private key, and trigger the generating module.

Optionally, the operating module is specifically configured to perform an inversion operation on the user private key intermediate value.

Optionally, the generating module is further configured to generate the authentication response according to the U2F authentication instruction and the user private key; specifically, organize signature data according to a random parameter and an applet parameter, sign on the signature data by using the user private key to obtain a signature result, generate the authentication response according to the signature result and the U2F authentication instruction, and trigger the returning module; and the returning module is further configured to return the authentication response to the client when the generating module generates the authentication response.

According to yet another aspect of the present application, provided is a key device, including a processor and a memory; where the memory is configured to store a program code; and the processor is configured to invoke the program code stored in the memory to execute the method according to any one of one aspect of the present application.

According to yet still another aspect of the present application, provided is a computer readable storage medium which stores instructions, when running in a computer, causes the computer to execute the method according to any one of one aspect of the present application.

Through the present application, the FIDO2 can authenticate the credential registered in the U2F, and the U2F can also authenticate the credential registered in the FIDO2, thereby improving usability and compatibility.

DETAILED DESCRIPTION OF THE EMBODIMENTS

Figure 1A:
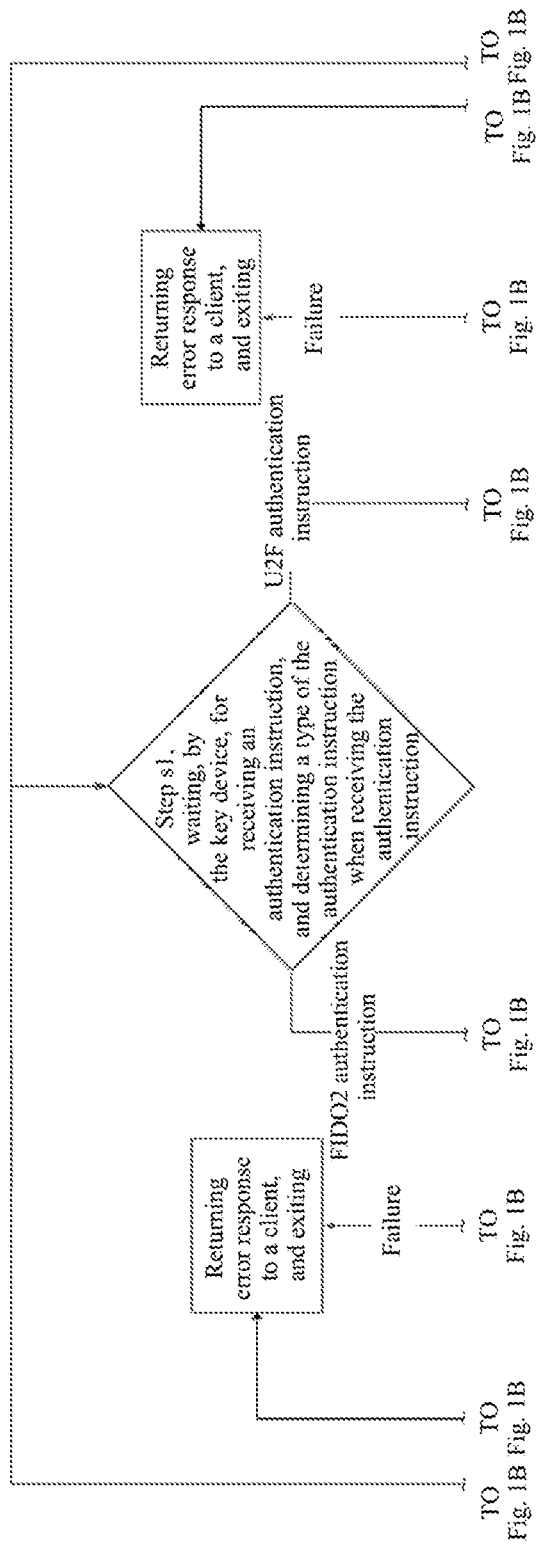
FIGS. 1A-1D are flowcharts of a working method for a key device according to Embodiment 1 of the present application.
Figure 1B:
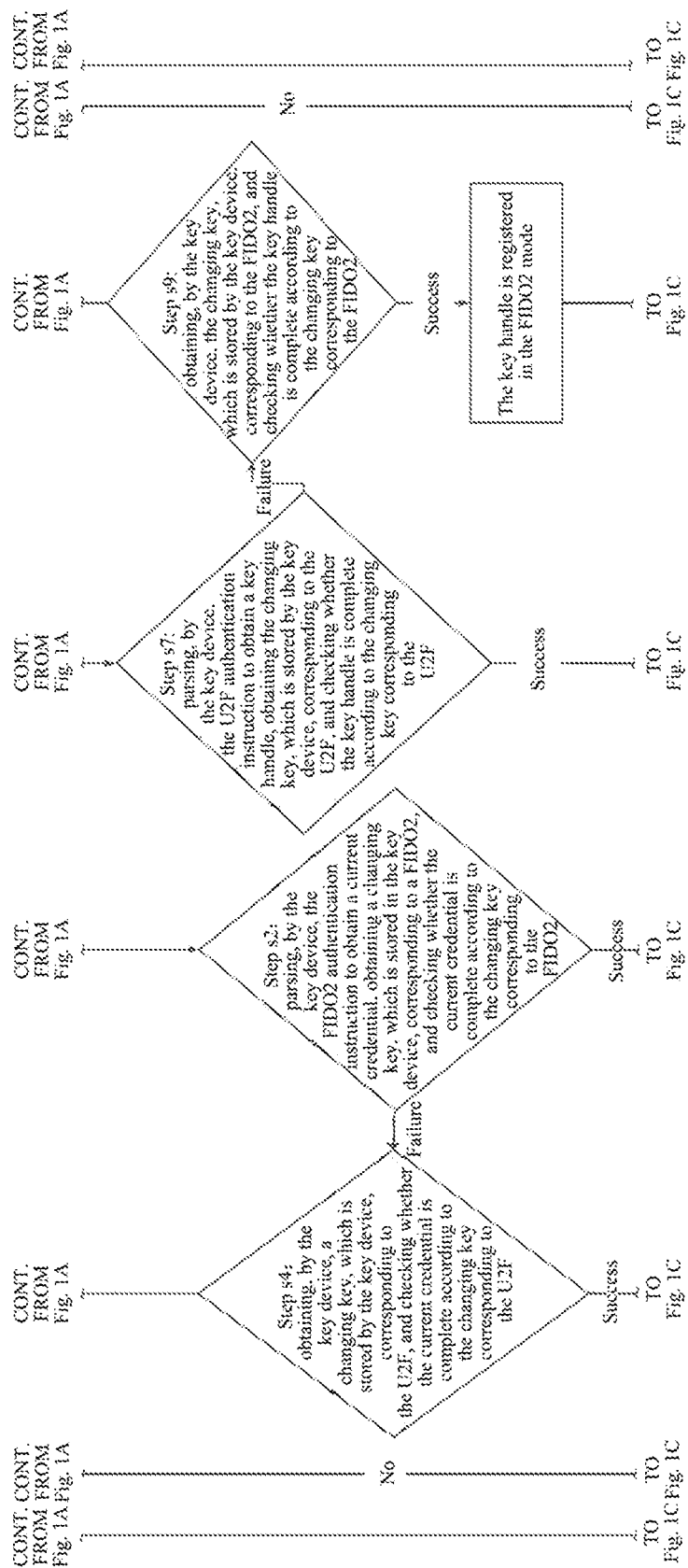
Figure 1C:
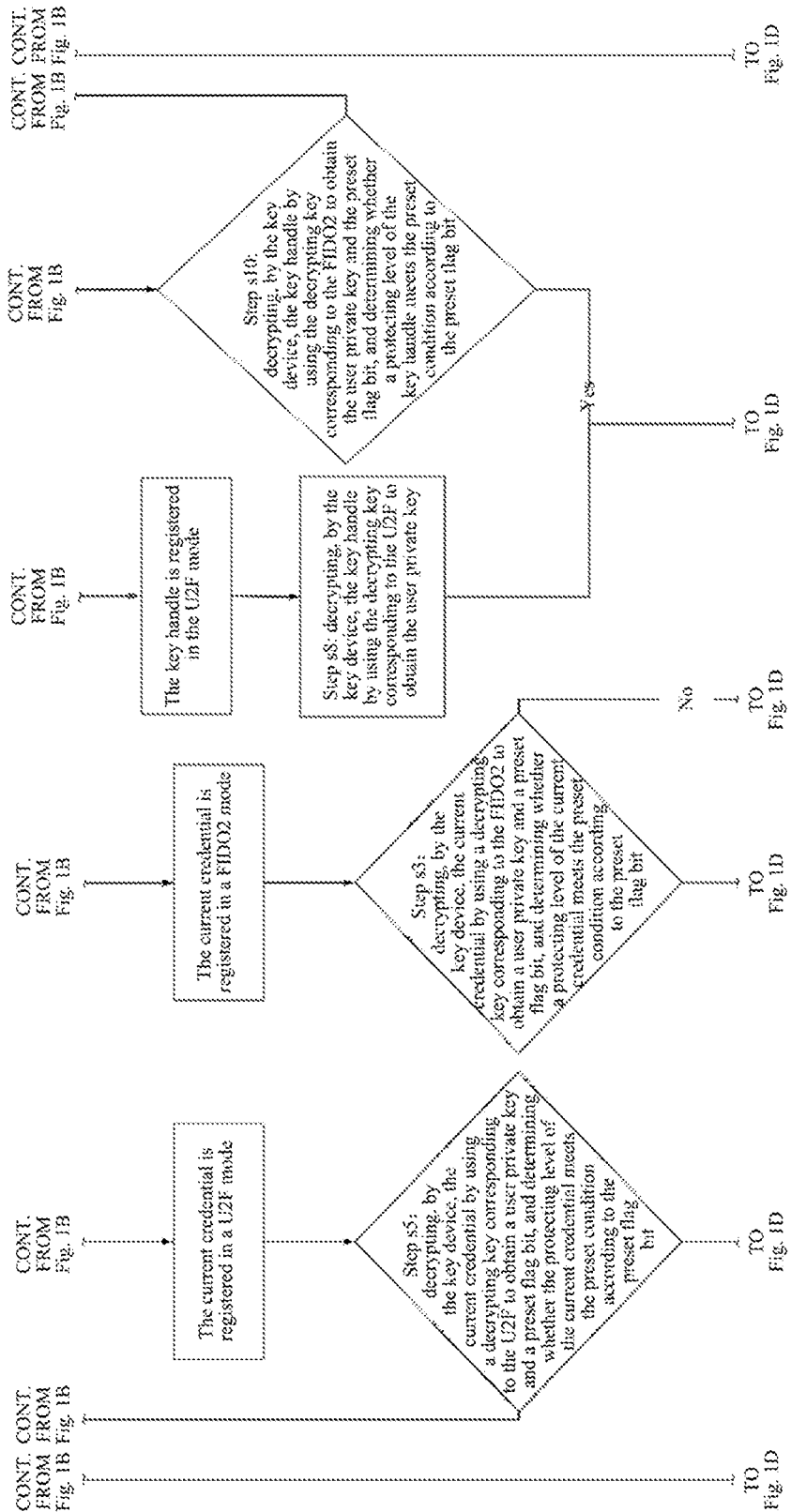
Figure 1D:
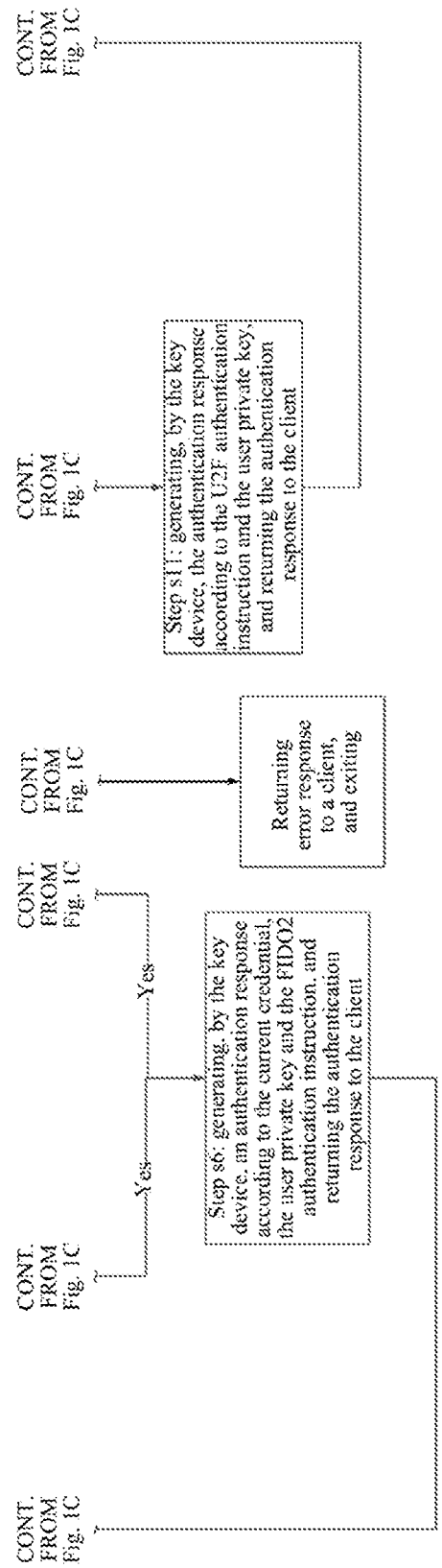
Figure 2A:
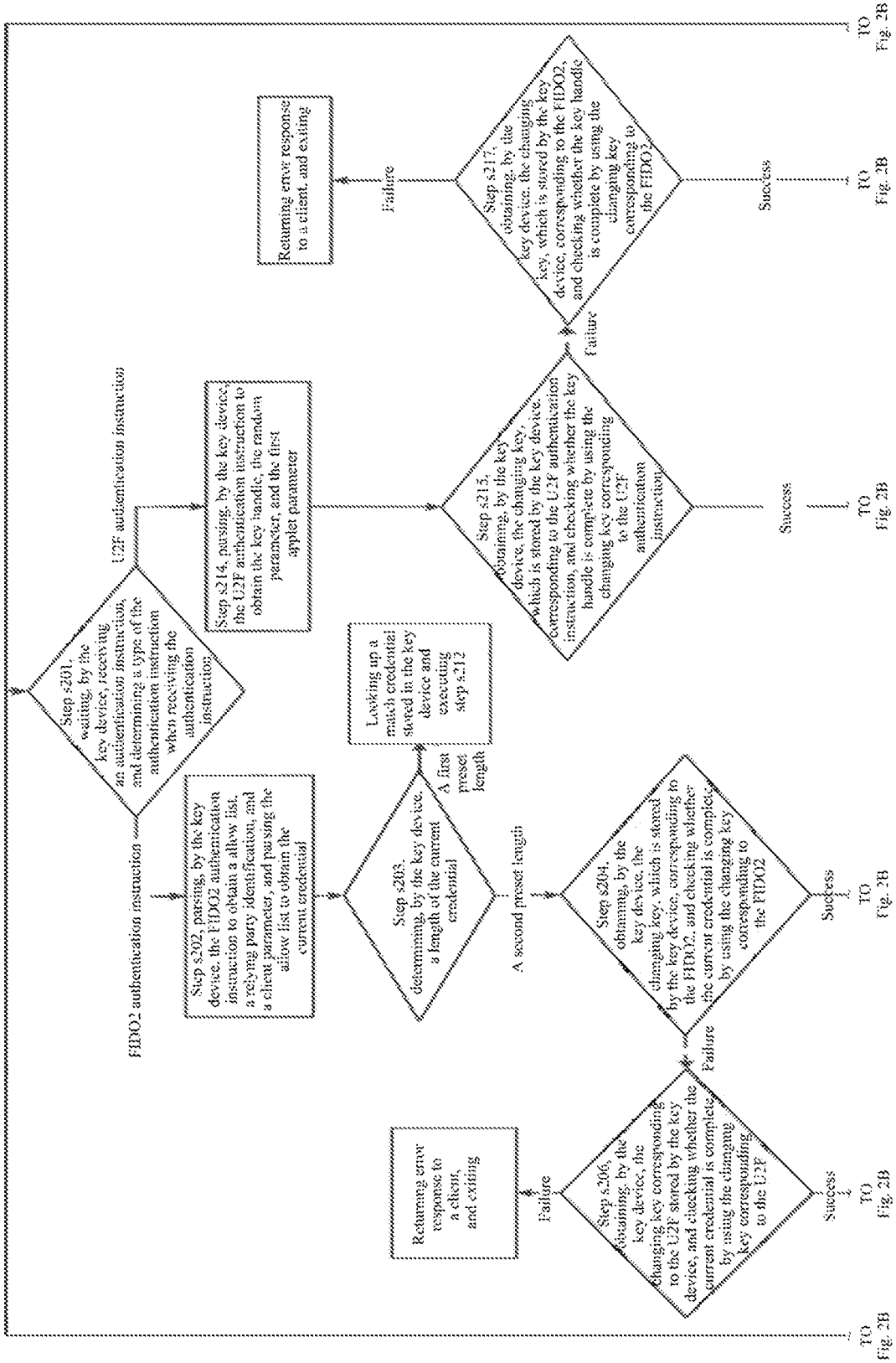
FIGS. 2A-2D are flowcharts of a working method for a key device according to Embodiment 2 of the present application.
Figure 2B:
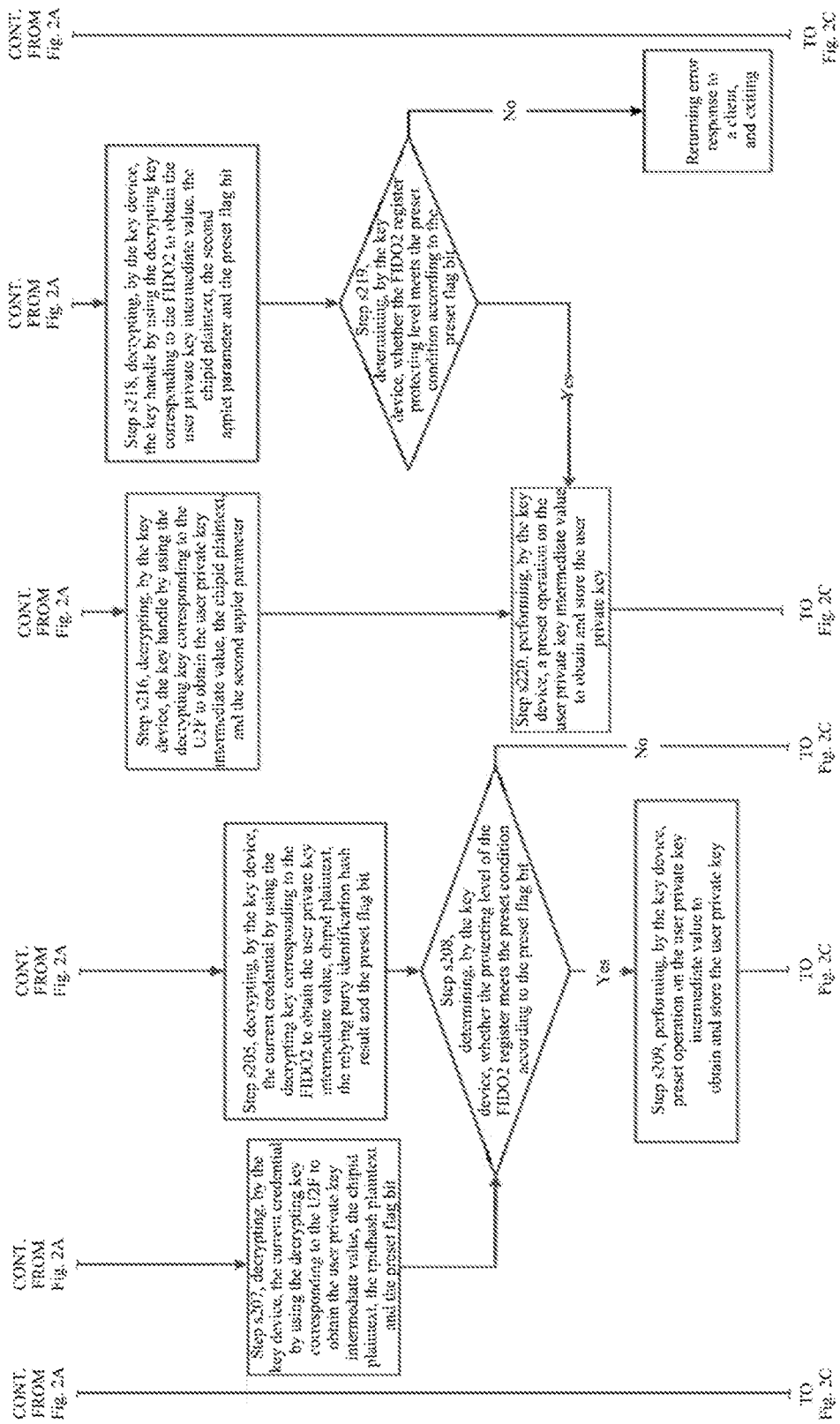
Figure 2C:
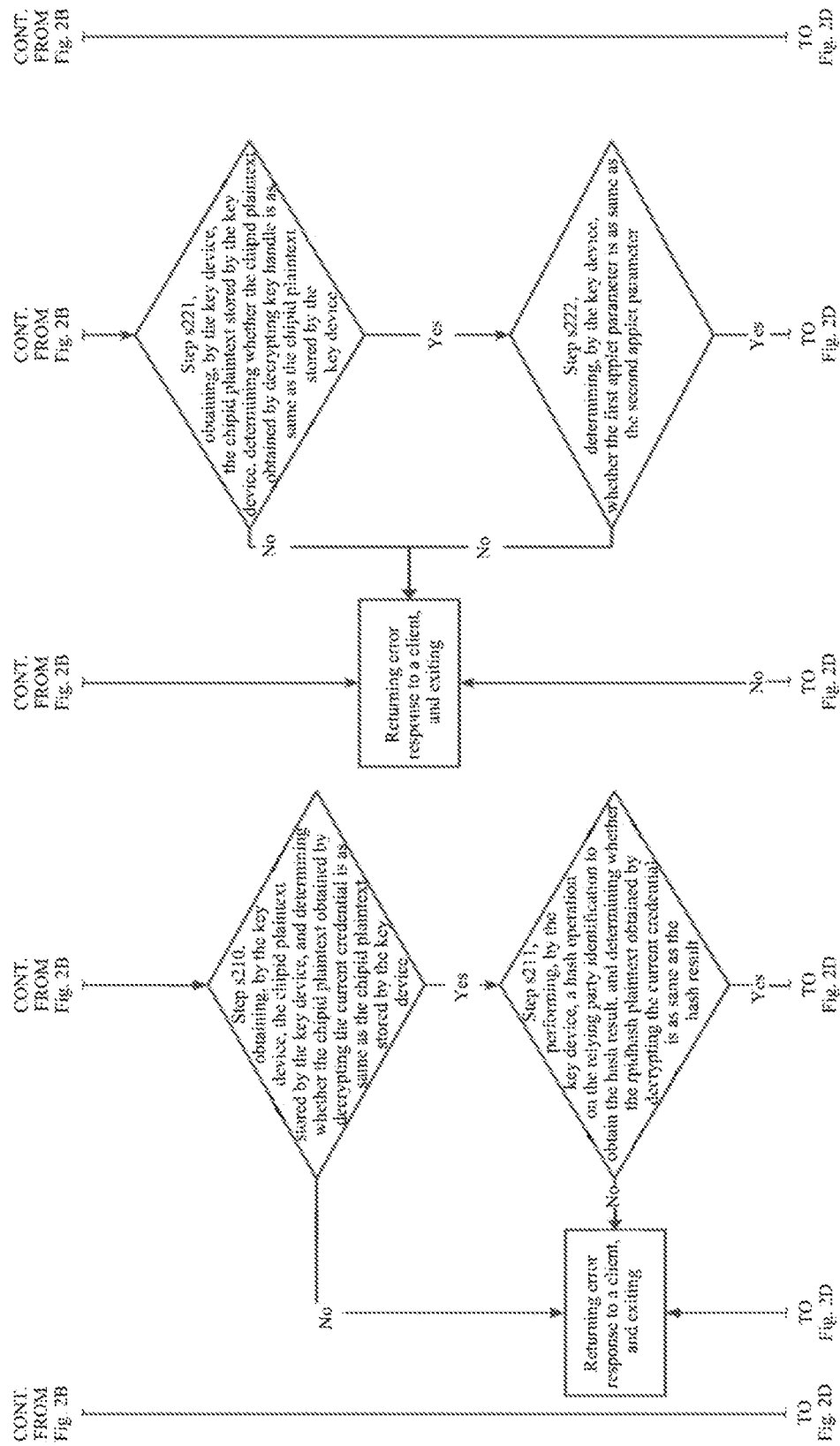
Figure 2D:
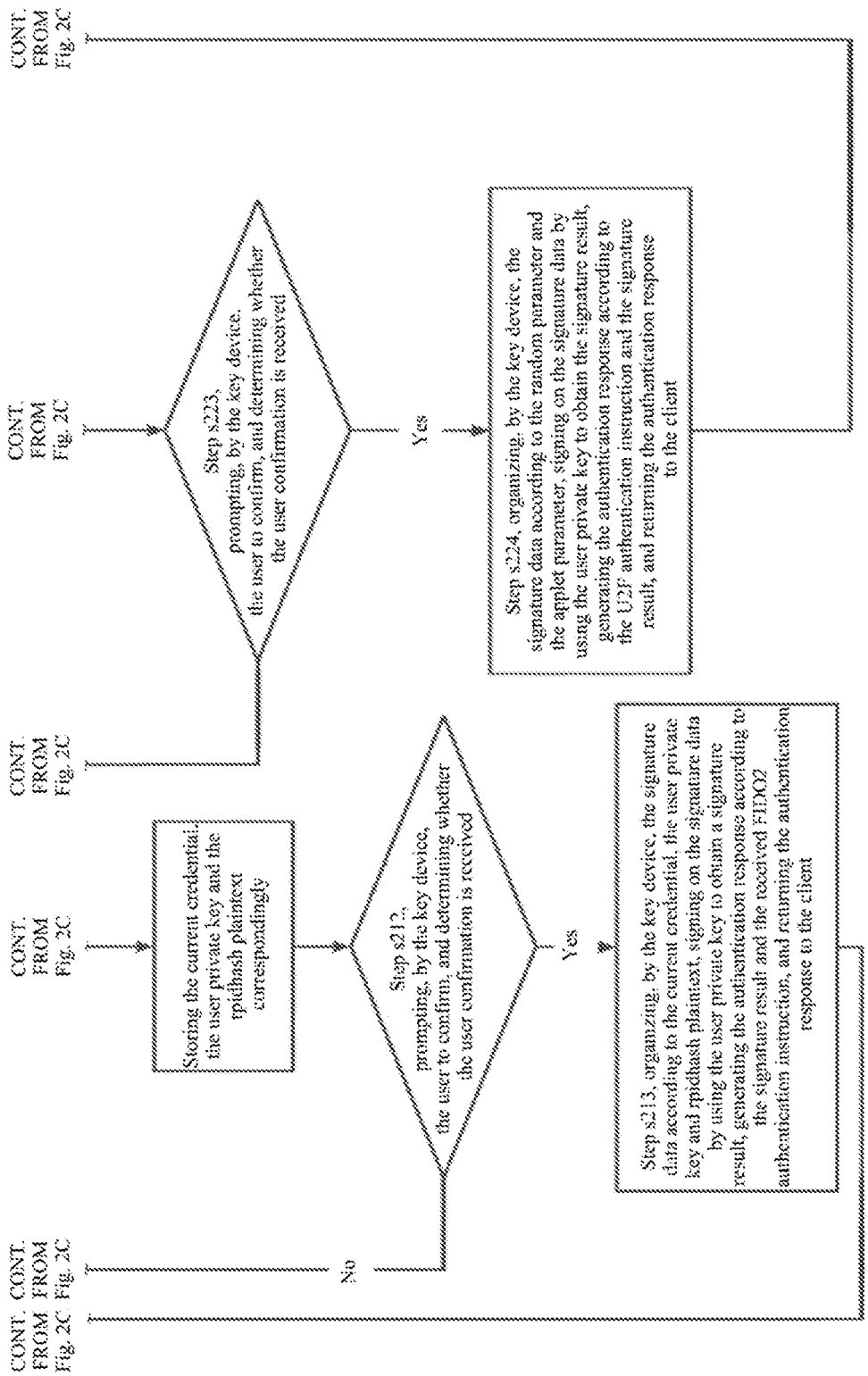
Figure 3A:
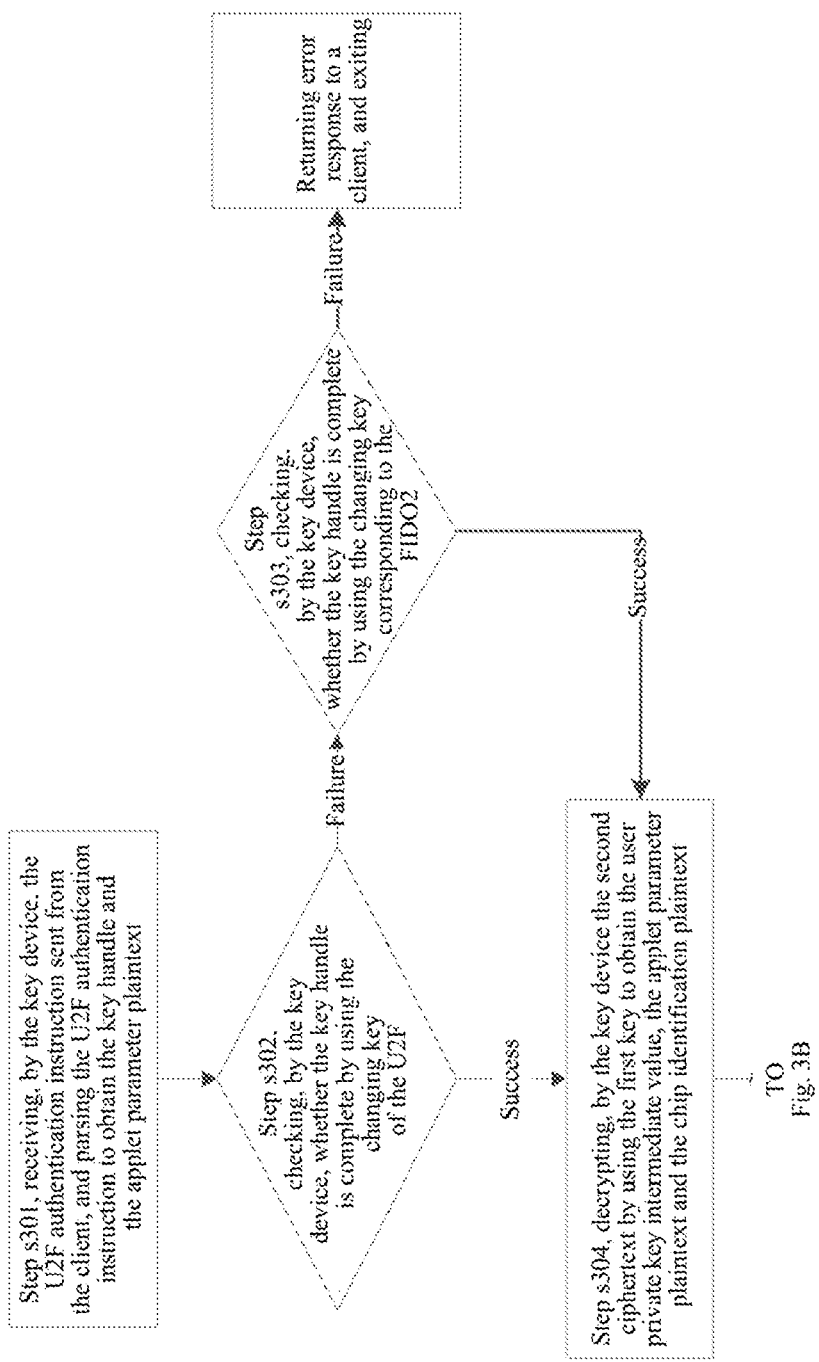
FIGS. 3A-3D are flowcharts of a working method for a key device according to Embodiment 3 of the present application.
Figure 3B:
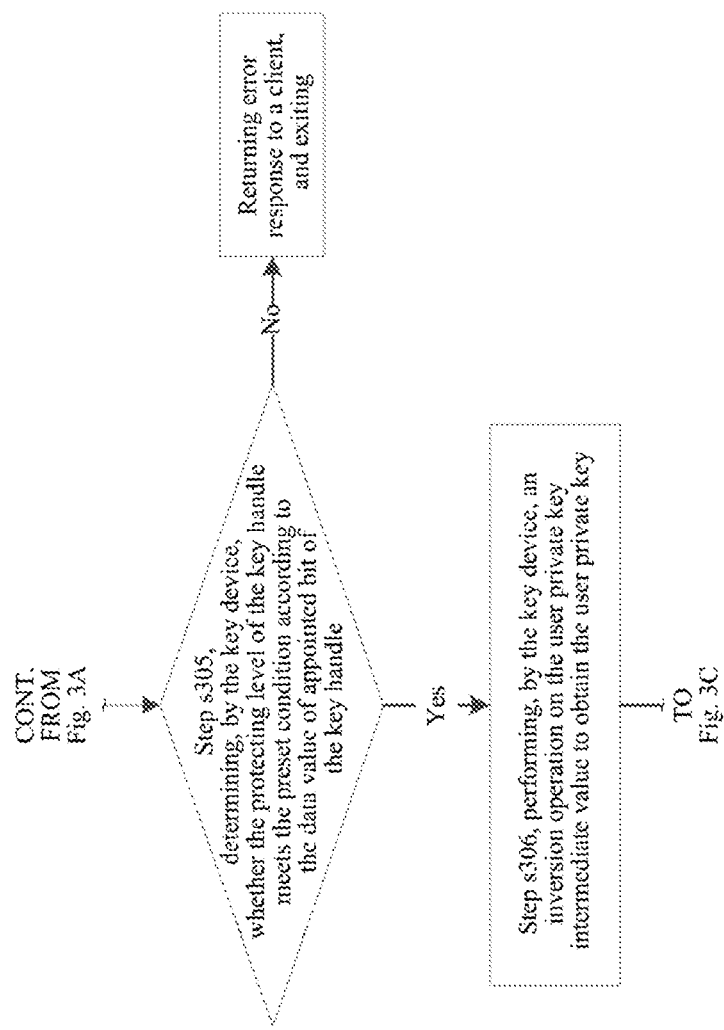
Figure 3C:
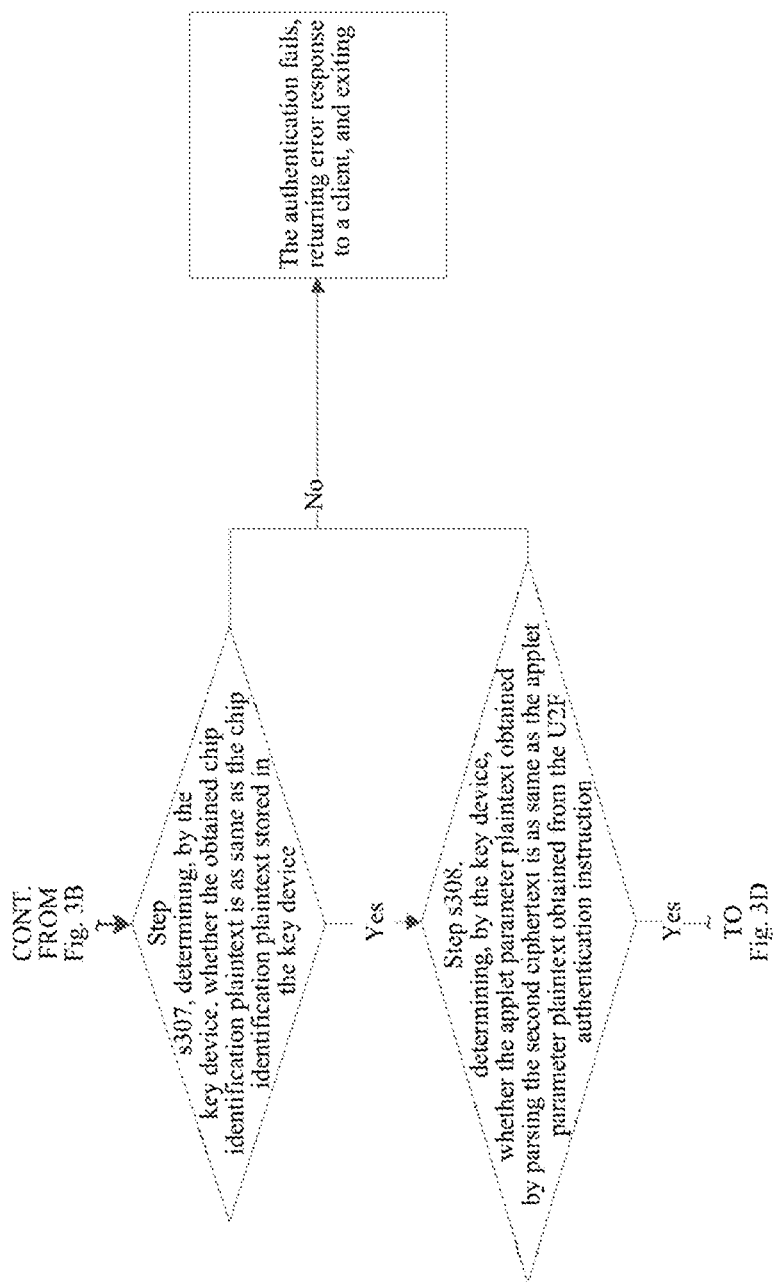
Figure 3D:
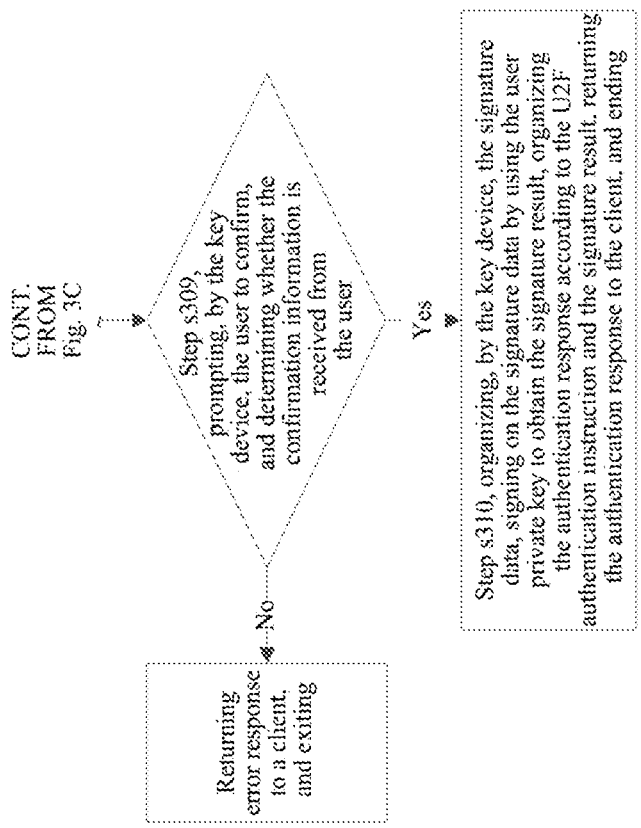
Figure 4A:
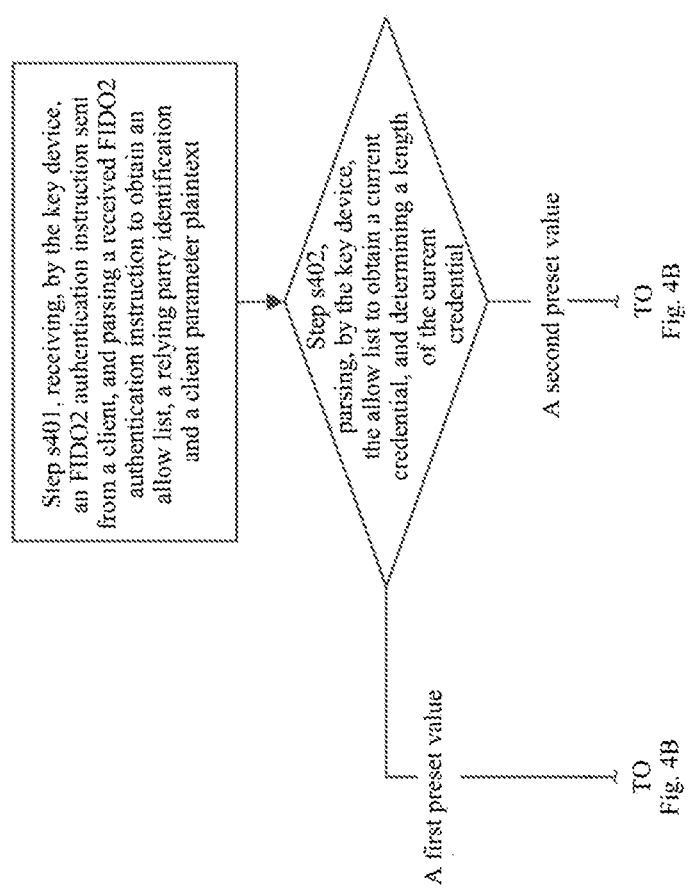
FIGS. 4A-4D are flowcharts of a working method for a key device according to Embodiment 4 of the present application.
Figure 4B:
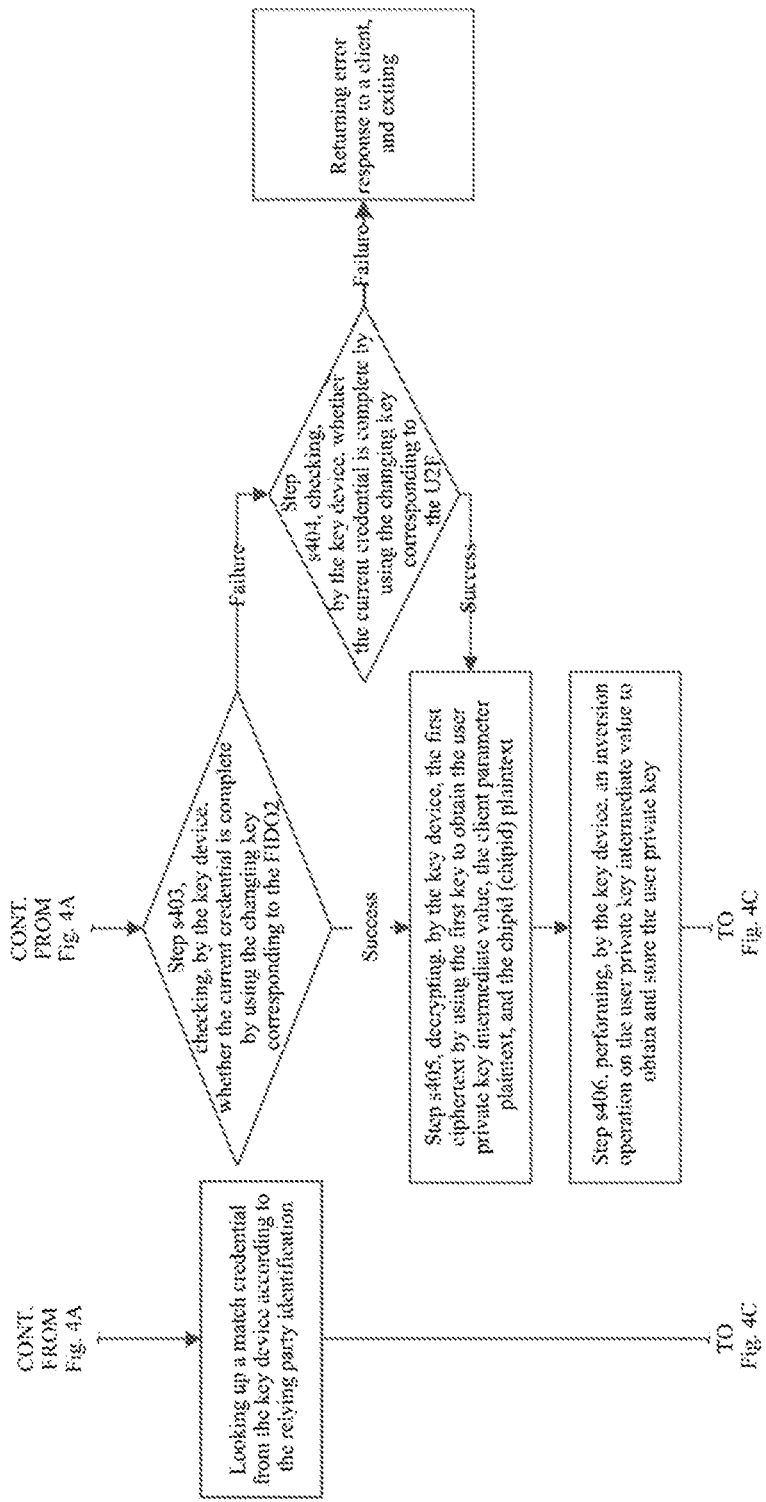
Figure 4C:
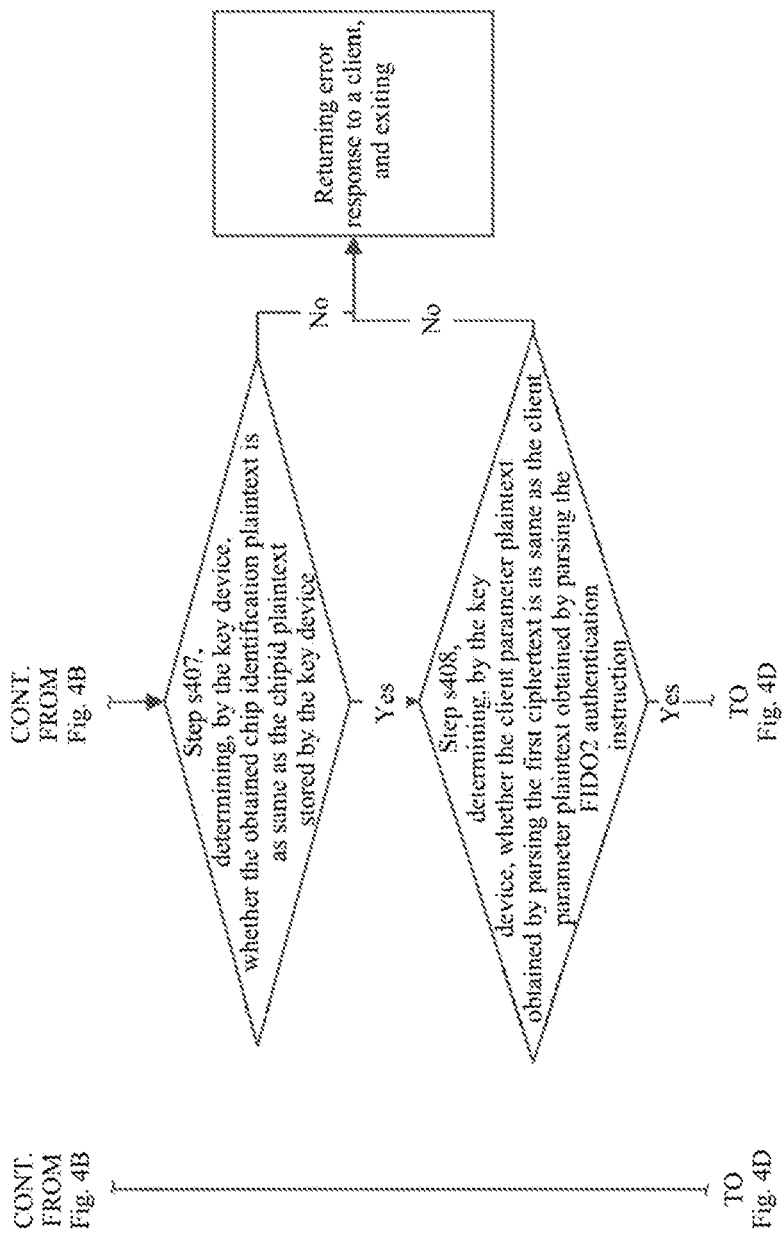
Figure 4D:
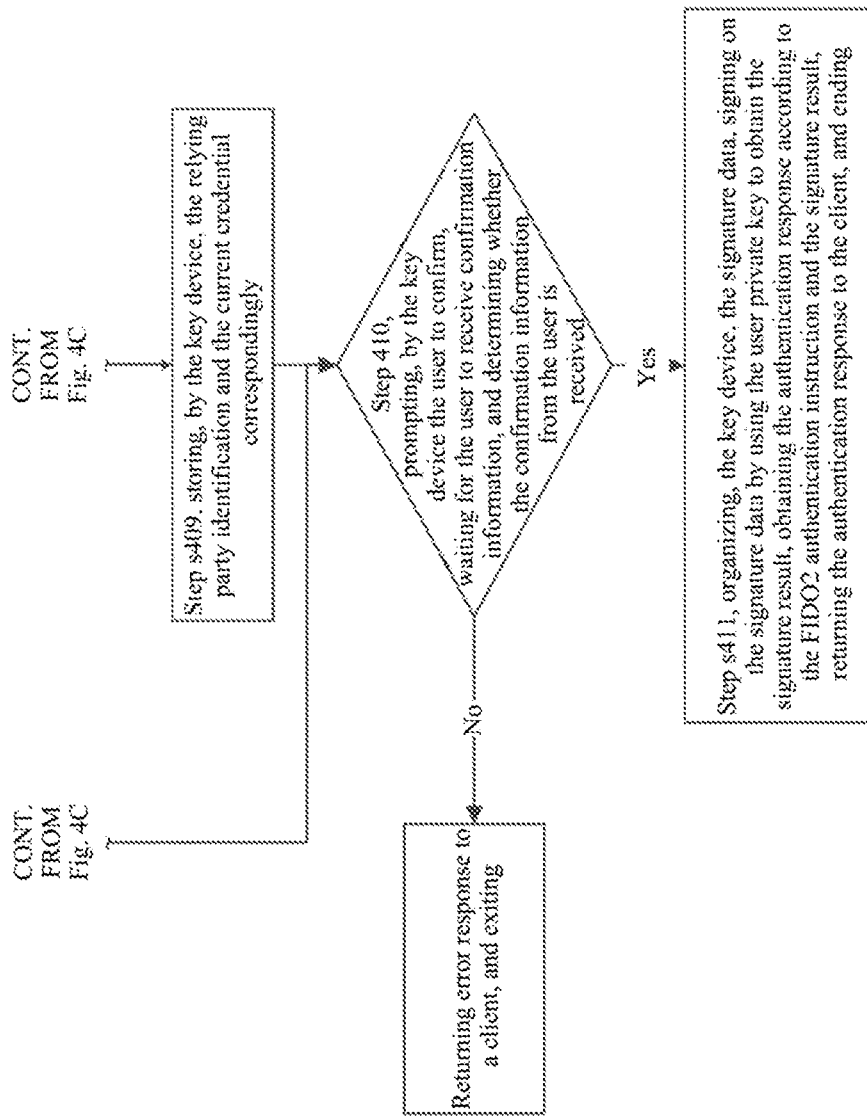

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments the present application, all other embodiments obtained by those skilled in the art without creative effort shall fall within the protection scope of the present application.

Embodiment 1

According to Embodiment 1 of the present application, provided is a working method for a key device, as shown in FIGS. 1A-1D, including:

step s1, waiting, by the key device, for receiving an authentication instruction, and determining a type of the authentication instruction when receiving the authentication instruction, executing step s2 if the authentication instruction is a FIDO2 authentication instruction; and executing step s7 if the authentication instruction is a U2F authentication instruction.

Step s2, parsing, by the key device, the FIDO2 authentication instruction to obtain a current credential, obtaining a changing key, which is stored in the key device, corresponding to a FIDO2, checking whether the current credential is complete according to the changing key corresponding to the FIDO2, if a check is successful, the current credential is registered in a FIDO2 mode and executing step s3; otherwise, executing step s4.

Step s3, decrypting, by the key device, the current credential by using a decrypting key corresponding to the FIDO2 to obtain a user private key and a preset flag bit, determining whether a protecting level of the current credential meets the preset condition according to the preset flag bit, when yes, executing step s6; otherwise, returning an error response to a client and exiting.

Step s4, obtaining, by the key device, a changing key, which is stored by the key device, corresponding to the U2F, checking whether the current credential is complete according to the changing key corresponding to the U2F, the current credential is registered by using U2F registration mode and executing step s5 when a check is successful; and returning an error response to the client and exiting, when the check fails.

Step s5, decrypting, by the key device, the current credential by using a decrypting key corresponding to the U2F to obtain a user private key and a preset flag bit, determining whether the protecting level of the current credential meets the preset condition according to the preset flag bit, when yes, executing step s6; otherwise, returning an error response to the client and exiting.

Step s6, generating, by the key device, an authentication response according to the current credential, the user private key and the FIDO2 authentication instruction, returning the authentication response to the client, and returning to step s1.

Step s7, parsing, by the key device, the U2F authentication instruction to obtain a key handle, obtaining the changing key, which is stored by the key device, corresponding to the U2F, checking whether the key handle is complete according to the changing key corresponding to the U2F, the key handle is registered by using a U2F mode and executing step s8 when a check is successful; and executing step s9 when the check fails.

Step s8, decrypting, by the key device, the key handle by using the decrypting key corresponding to the U2F to obtain the user private key, and executing step s11.

Step s9, obtaining, by the key device, the changing key, which is stored by the key device, corresponding to the FIDO2, checking whether the key handle is complete according to the changing key corresponding to the FIDO2, when a check is successful, the key handle is registered by using a FIDO2 mode, and executing step s10; when a check fails, returning an error response to the client and exiting.

Step s10, decrypting, by the key device, the key handle by using the decrypting key corresponding to the FIDO2 to obtain the user private key and the preset flag bit, determining whether a protecting level of the key handle meets the preset condition according to the preset flag bit, when yes, executing step s11; otherwise, returning an error response to the client and exiting.

Step s11, generating, by the key device, the authentication response according to the U2F authentication instruction and the user private key, returning the authentication response to the client, and returning to step s1.

Optionally, the parsing, by the key device, the FIDO2 authentication instruction to obtain the current credential in step s2 is specifically that: parsing, by the key device, the FIDO2 authentication instruction to obtain an allow list, a relying party identification, and a client parameter; and parsing the permit name list to obtain the current credential.

Optionally, step s3 is specifically that:

step s3-1, decrypting, by the key device, the current credential by using the decrypting key corresponding to the FIDO2 to obtain a user private key intermediate value, a chip identification plaintext, a relying party hash result plaintext and an extension parameter flag bit.

Step s3-2, determining, by the key device, whether the protecting level of the current credential meets the preset condition according to the extension parameter flag bit, when yes, executing step s3-3; otherwise, returning an error response to the client and exiting.

Step s3-3, performing, by the key device, a preset operation on the user private key intermediate value to obtain the user private key, and executing step s6.

Optionally, the preset operation in step s3-3 is an inverse operation.

Optionally, step s5 specifically includes:

step s5-1, decrypting, by the key device, the current credential by using the decrypting key corresponding to the U2F to obtain a user private key intermediate value, a chip identification plaintext, a relying party identification hash and an extension parameter flag bit.

Step s5-2, determining, by the key device, whether the protecting level of the current credential meets the preset condition according to the extension parameter flag bit, when yes, executing step s5-3; otherwise, returning an error response to the client and exiting.

Step s5-3, performing, by the key device, a preset operation on the user private key intermediate value to obtain the user private key.

Optionally, the preset operation in step s5-3 is an inverse operation.

Optionally, step s8 specifically includes:

step s8-1, decrypting, by the key device, the key handle by using the decrypting key corresponding to the U2F to obtain a user private key intermediate value, a chip identification plaintext and a second applet parameter.

Step s8-2, operating, by the key device, the preset operation on the user private key intermediate value to obtain the user private key, and executing step s11.

Optionally, the preset operation in step s8-2 is the inverse operation.

Optionally, step s11 is specifically that:

organizing, by the key device, signature data according to a random parameter and an applet parameter, signing on the signature data by using the user private key to obtain a signature result, and generating the authentication response according to the signature result and the U2F authentication instruction, and returning the authentication response to the client.

Embodiment 2

According to Embodiment 2 of the present application, provided is a working method for a key device, as shown in FIGS. 2A-2D, including:

step s201, waiting, by the key device, for receiving an authentication instruction, and determining a type of the authentication instruction when receiving the authentication instruction, and executing step s202 when the authentication instruction is the FIDO2 authentication instruction; and executing step s214 when the authentication instruction is the U2F authentication instruction.

Optionally, the key device determines the type of the instruction according to a value of CLA of input an application protocol data unit (APDU), the authentication instruction is the FIDO2 authentication instruction if the value of the CLA is 80; and the authentication instruction is the U2F authentication instruction if the value of the CLA is 00.

For instance, when receiving the authentication instruction, the key device determines the type of the instruction, if the instruction is 80 00 bb 02 A6 01 76 77 65 62 61 75 74 68 6E 74 65 73 74 2E 66 74 73 61 66 65 2E 63 6E 02 58 20 08 EE B3 85 94 BC 89 A4 EA 25 7D 8C 53 80 31 EE B9 2D 69 E3 F5 3D E1 7E 02 8E 73 1F 6D 74 02 EF 03 81 A2 62 69 64 58 20 3B B4 14 44 53 CF 8B B6 39 05 B4 82 28 B7 E9 B1 F4 15 C4 D2 91 A7 B5 CC 14 AA 8F FA 17 27 1A ED 64 74 79 70 65 6A 70 75 62 6C 69 63 2D 6B 65 79 05 A1 62 75 70 F5 06 50 06 95 CA AE A2 43 38 46 F0 E5 5D C1 DF 36 FC 73 07 01 or 80 00 bb 02 A4 01 76 77 65 62 61 75 74 68 6E74 65 73 74 2E 66 74 73 61 66 65 2E 63 6E 02 58 20 5B 69 62 0E 9D 1E FD AE 08 AA 4A 99 88 89 DE 1E F3 0C C1 DB A6 3C E0 4D 98 4A 80 65 48 DF 47 29 03 81 A2 62 69 64 58 60 63 A1 4D 03 87 6F C7 8D 17 48 F1 07 01 9C9C D7 F8 99 BB 7A B4 91 EF 0C 75 31 10 B1 CB CA 1F 97 D8 DB E1 C3 59 24 A3 91 76 A4 AC 68 05 87 0B 03 B4 92 BE 26 F2 A4 8C 37 75 AE 56 58 1D 2C 34 AB 98 32 B4 3A DB C8 5D CD B9 F4 EA 82 4E F4 D3 45 DB 9C C6 A5 20 6D 78 3B 18 1B 37 78 35 56 3E F7 64 74 79 70 65 6A 70 75 62 6C 69 63 2D 6B 65 79 05 A1 62 75 70 F5, the authentication instruction is the FIDO2 authentication instruction; and if the authentication instruction is 00020300000091CFF69B107235A3E56E18 BAA270A3A097DDBD75F4713E7C81 26491E9057DC3 2310102030405060708090A0B0C0D0E0F100102030405 06070809 0A0B0C0D0E0F10509C3BDE1387CEDD769 DEE530F3618845CB4D0FFFEB57A7 55B4A7909D762C BDCD9DF5BB2D531858DB4027E41AD071958FD29D EE200B E9C8C62140BA1EE0B26CC6F40BEBC02B8B 0A500B9A0D43692A12B290000, the authentication instruction is the U2F authentication instruction.

Step s202, parsing, by the key device, the FIDO2 authentication instruction to obtain an allow list, a relying party identification, and a client parameter, and parsing the allow list to obtain the current credential.

For instance, a structure obtained after parsing is that:
{1: "webauthntest.ftsafe.cn", 2: h'5B69620E9D1E FDAE08AA4A998889DE1EF30CC1DBA63CE04D 984A806548D F4729', 3: [{"id": h'63A14D03 876FC78D1748F107019C9CD7F899BB7AB491EF0 C753110B1CBCA 1F97D8DBE1C35924A39176A4 AC6805870B03B492BE26F2A48C3775AE56581D 2C34AB9832B43ADBC85DCDB9F4EA824EF4D3 45DB9CC6A5206D783B181B37 7835563EF7', "type": "public-key"}], 5: {"up": true}};

in which, 1-rpid 2-clientDataHash 3-allowList 5-option;
the allow list is specifically that: 63A14D0387 6FC78D1748F107019C9CD7F899BB7AB491EF0C 753110B1CBCA1F 97D8DBE1C35924A39176A4A C6805870B03B492BE26F2A48C3775AE56581D2C 34AB9832B43ADBC85DCDB9F4EA824EF4D345; and step s203, determining, by the key device, a length of the current credential, looking up a match credential stored in the key device and executing step s212, if the length of the current credential is a first preset length; and executing step s204 if the length of the current credential is a second preset length.

Optionally, the key device determines the length of the current credential, and looks up the match credential stored in the key device and executes step s212 if the length of the current credential is 32 bytes; and executes step s204 if the length of the current credential is 96 bytes.

For instance, when the current credential is 3BB4144453CF8BB63905B48228B7E9B1F415C4D291A 7B5CC14AA8FFA17271A ED, the length of current credential is 32 bytes, the match credential stored in the key device is looked up, and step s212 is executed; and when the current credential is 63A14D03876FC78D174 8F107019C9CD7F899BB7AB491EF0C753110B1CBCA1F 97D8DBE1C35924A39176A4AC6805870B03B492BE26F 2A48C3775AE56581D2C 34AB9832B43ADBC85DCDB9 F4EA824EF4D345DB9CC6A5206D783B181B3778 35563EF7, the length of the current credential is 96 bytes, and step s204 executed; and step 204, obtaining, by the key device, the changing key, which is stored by the key device, corresponding to the FIDO2, checking whether the current credential is complete by using the changing key corresponding to the FIDO2, if a check is successful, executing step s205; and if the check fails, executing step s206.

Optionally, in the case that the current credential is checked to be complete by using the changing key corresponding to the FIDO2, it is illustrated that the credential is registered in the FIDO2.

Optionally, step s204 specifically includes:
step s204-1, parsing, by the key device, the allow list to obtain a first ciphertext and a first MAC value;
where the first ciphertext is the ciphertext obtained by encrypting a private key intermediate value of 32 bytes, a client parameter of 32 bytes, a chip identification (also known as chipid) of 8 bytes, an extension flag bit of one byte and a default filled value of 7 bytes.

For instance, the first ciphertext obtained by parsing the allow list is 63A14D03876FC78D1748F107019C9C D7F899BB7AB491EF0C753110B1CBCA1F 97D8DBE1C 35924A39176A4AC6805870B03B492BE26F2A48C3775 AE56581D2C34AB9832B43ADBC85DCDB9F4E A824EF4D345;
the first MAC value is DB9CC6A5206 D783B181B377835563EF7; and
step s204-2, performing, by the key device, an operation on the first ciphertext by using the changing key corresponding to the FIDO2 according to a preset operation to obtain a second MAC value, and determining whether the second MAC value is as same as the first MAC value, if yes, the current credential being checked to be complete, and executing step s205; otherwise, the current credential being checked to be not complete, and executing step s206.

For instance, performing a signatureX.ALG_AES_C-MAC16 operation on the first ciphertext 63A14D03876FC78D1748F107019C9CD7F899BB7AB4 91EF0C753110B1CBCA1F 97D8DBE1C35924A39176A 4AC6805870B03B492BE26F2A48C3775AE56581D2C 34AB9832B43ADBC85DCDB9F4EA824EF4D345 to obtain the second MAC value DB9CC6A5206D 783B181B377835563EF7; thus the first MAC value is as same as the second MAC value, the current credential is checked to be complete, and step s205 is executed.

Step s205, decrypting, by the key device, the current credential by using the decrypting key corresponding to the FIDO2 to obtain the user private key intermediate value, chipid plaintext, the relying party identification hash result plaintext and the preset flag bit; and executing step s208.

Optionally, step s205 is specifically that the key device decrypts the current credential by using the decrypting key corresponding to the FIDO2 to obtain the user private key intermediate value of 32 bytes, the chipid plaintext of 8 bytes, rpidhash plaintext of 32 bytes and extension parameter flag bit of 1 byte, and executes step s208.

Step s206, obtaining, by the key device, the changing key corresponding to the U2F stored by the key device, checking whether the current credential is complete by using the changing key corresponding to the U2F, if a check being successful, executing step s207; and if the check failing, returning an error response to the client, and exiting.

For instance, the authentication instruction is 80 00 bb 02 A4 01 76 77 65 62 61 75 74 68 6E 74 65 73 74 2E 66 74 73 61 66 65 2E 636E 02 58 20 56 77 F3 51 CA AD 32 16 D5 97 07 69 E7 36 6A 3D E7 25 EF 81 A3 EF A6 E3 89 4D A4 65 37 4C D6 FF 03 81 A2 62 69 64 58 60 FA F5 3E 15 3F 17 F8 C7 62 A9 B7 B3 68 5A AA C4 D8 97 7D F9 39 94 BF 5C 8D D0 94 FD F4 15 78 81 07 30F5 29 01 22 33 9B 3B E4 5B EA 72 97 24 7B 70 30 32 3E 32 B6 2B 2D 4C 33 58 25 E7 CC 67 F4 16 49 FA F0 78 CC 6D 3C 3D 0A 75 BE 24 C5 89 8B 0B DA D5 86 71 09 F3 31 1D 1F F3 28 1E 42 C9 E4 64 74 79 70 65 6A 70 75 62 6C 69 63 2D 6B 65 79 05 A1 62 75 70 F5, the data structure obtained after parsing is:
{1: "webauthntest.ftsafe.cn", 2: h'5677F351CAAD 3216D5970769E7366A3DE725EF81A3EFA6E3894 DA465374CD 6FF', 3: [{"id": h'FAF53E153F1 7F8C762A9B7B3685AAAC4D8977DF93994BF5C 8DD094FDF415 78810730F5290122339B3BE45BE A7297247B7030323E32B62B2D4C335825E7CC 67F41649FAF078CC6D3C3D0A75BE24C5898B0B DAD5867109F3311D1FF3281E 42C9E4', "type": "public-key"}], 5: {"up": true}};
in which, 1 represents rpid; 2 represents clientDataHash; 3 represents allowList; and 5 represents option;
the value of the allow list data ciphertext FAF53E153F17F8C762A9B7B3685AAAC4D8977D F93994BF5C8DD094FDF41578810730F5290 122339B3BE45BEA7297247B7030323E32B62B2D 4C335825E7CC67F41649FAF078CC6D3C3D0 A75BE24C5898B is:
0BDAD5867109F3311D1FF3281E42C9E4;
optionally, step s206 includes:
step s206-1, parsing, by the key device, the current credential to obtain the first ciphetext and the first MAC value.

Step s206-2, performing, by the key device, a preset operation on the first ciphertext by using the changing key corresponding to the U2F to obtain the second MAC value, determining whether the first MAC value is as same as the second MAC value, if yes, checking that the current credential is complete, and executing step s207; otherwise, checking that the current credential is not complete, and returning an error response to the client, and exiting.

Step s207, decrypting, by the key device, the current credential by using the decrypting key corresponding to the U2F to obtain the user private key intermediate value, the chipid plaintext, the rpidhash plaintext and the preset flag bit.

Optionally, step s207 is specifically that the key device decrypts the current credential by using the decrypting key corresponding to the U2F to obtain the user private key intermediate value of 32 bytes, the chipid plaintext of 8 bytes, the rpidhash plaintext of 32 bytes, extension parameter flag bit of 1 byte and the default filled value of 7 bytes.

Where a default value of the extension parameter flag bit of 1 byte is 0.

Step s208, determining, by the key device, whether the protecting level of the FIDO2 register meets the preset condition according to the preset flag bit, if yes, executing step s209; otherwise, returning an error response to the client, and exiting.

For instance, if the default value of the preset extension flag bit is 0, extension is not supported; if the default value of the preset extension flag bit is 1, the extension hmac-secret is supported; if the default value of the present extension flag bit is 2, the extension credential-protection is supported and the protecting level is 1-level default level; if the default value of the preset extension flag bit is 3, the extensions hmac-secret and credential-protection are supported and the protecting level is 1-level default level; if the default value of the preset extension flag bit is 4, the extension credential-protection is supported and the protecting level is 2 level which requires carrying allow list authentication level; if the default value of the preset extension flag bit is 5, the extensions hmac-secret and credential-protection are supported and the protecting level is 2 level which requires carrying allow list authentication level; if the default value of the preset extension flat bit is 8, the extension credential-protection is supported and the protecting level is a highest level of 3 level which means the user identification must be verified, such as finger print or iris. If the default value of the preset extension flat bit is 9, the extensions hmac-secret and credential-protection are supported and the protecting level is the highest level of 3 level which means the user identification must be verified, such as finger print and iris.

Step s209, performing, by the key device, preset operation on the user private key intermediate value to obtain and store the user private key.

Optionally, step s209 is specifically that the key device performs an inversion operation on the user private key intermediate value to obtain and store the user private key.

For instance, a XOR operation is performed on the private key and rapidhash parameter to obtain the private key intermediate value, and the inversion operation means that the XOR operation is performed again on the private key intermediate value and the rapidhash parameter to obtain the private key correct data.

Step s210, obtaining, by the key device, the chipid plaintext stored by the key device, determining whether the chipid plaintext obtained by decrypting the current credential is as same as the chipid plaintext stored by the key device, if yes, executing step s211; otherwise, returning an error response to the client and exiting.

Step s211, performing, by the key device, a hash operation on the relying party identification to obtain the hash result, determining whether the rpidhash plaintext obtained by decrypting the current credential is as same as the hash result, if yes, storing the current credential, the user private key and the rpidhash plaintext correspondingly, and executing step s212; otherwise, returning an error response to the client and exiting.

Step s212, prompting, by the key device, the user to confirm, determining whether the user confirmation is received, if yes, executing step s213; otherwise, returning an error response to the client and exiting.

Step s213, organizing, by the key device, the signature data according to the current credential, the user private key and rpidhash plaintext, signing on the signature data by using the user private key to obtain a signature result, generating the authentication response according to the signature result and the received FIDO2 authentication instruction, and returning the authentication response to the client, and returning to step s201.

Step s214, parsing, by the key device, the U2F authentication instruction to obtain the key handle, the random parameter, and the first applet parameter;

for instance, the U2F authentication instruction is 00020300000091CFF69B107235A3E56E18BAA270 A3A097DDBD75F4713E7C8126491E9057DC323 101020304050607080090A0B0C0D0E0F1001020304 05060708090A0B0C0D0E0F10509C3BDE1387 CEDD769DEE530F3618845CB4D0FFFEB57A7 55B4A7909D762CBDCD9DF5BB2D531858DB40 27E41AD071958FD29DEE200BE9C8C62140BA1 EE0B26CC6F40BEBC02B8B0A500B9A0D43692 A12B290000, the U2F authentication instruction is parsed to obtain the random parameter of 32 bytes: CFF69B107235A3E56E18BAA270A3A097DDBD7 5F4713E7C8126491E9057DC3 231; the applet parameter of 32 bytes: 0102030405060708090A0B 0C0D0E0F1001020304050607080090A0B0C0D0E0F 10; a length of the handle of 1 byte: 96; and the handle content is: A8CCF559C0792DE1E88938AED 2975E144FDD5FF1376811B90CA17CDC0666A 59B6ACEC983C365BC63C892B24F5C9AE40F51F 30D8865E74EABFCB2A997A7 1F30D7308E0479 09034150B660353410FB19F08062523A2EA04D2 44C87BE6A60 AF094E.

Step s215, obtaining, by the key device, the changing key, which is stored by the key device, corresponding to the U2F authentication instruction, and checking whether the key handle is complete by using the changing key corresponding to the U2F authentication instruction, if a check is successful, executing step s216; otherwise, executing step s217.

Optionally, step s215 specifically includes:
step s215-1, parsing, by the key device, the key handle to obtain the second ciphertext and the third MAC value; and step s215-2, performing, by the key device, the preset operation on the second ciphertext by using the changing key corresponding to the U2F to obtain a fourth MAC value, determining whether the third MAC value is as same as the fourth MAC value, if yes, checking that the key handle is complete, and executing step s216; otherwise, checking that the key handle is not complete, and executing step s217.

Step s216, decrypting, by the key device, the key handle by using the decrypting key corresponding to the U2F to obtain the user private key intermediate value, the chipid plaintext, and the second applet parameter; and executing step s220.

Optionally, step s216 is specifically that the key device decrypts the key handle by using the decrypting key corresponding to the U2F to obtain the user private key intermediate value, the chipid plaintext, and the second applet parameter, and executing step s220.

Step s217, obtaining, by the key device, the changing key, which is stored by the key device, corresponding to the FIDO2, and checking whether the key handle is complete by using the changing key corresponding to the FIDO2, if a check is successful, executing step s218; and if the check fails, returning an error response to the client, and exiting.

Optionally, step s217 specifically includes:
step s217-1, parsing, by the key device, the handle to obtain the second ciphertext and the third MAC address.

Step s217-2, performing, by the key device, a preset operation on the second ciphertext by using the changing key corresponding to the FIDO2 to obtain the fourth MAC value, determining whether the third MAC value is as same as the fourth MAC value, if yes, a check is successful, and executing step s218; otherwise, the check fails, returning an error response to the client and exiting.

For instance, the preset operation in the step s215-2 and step s217-2 is a SignatureX.ALG_AES_CMAC16 operation.

Step s218, decrypting, by the key device, the key handle by using the decrypting key corresponding to the FIDO2 to obtain the user private key intermediate value, the chipid plaintext, the second applet parameter and the preset flag bit.

Optionally, step s218 is specifically that the key device decrypts the key handle by using the FIDO2 decrypting key to obtain the user private key intermediate value, the chipid plaintext, the second applet parameter and the extension parameter flag bit.

Step s219, determining, by the key device, whether the FIDO2 register protecting level meets the preset condition according to the preset flag bit, if yes, executing step s220; otherwise, returning an error response to the client, and exiting.

Optionally, step s219 is specifically that the key device determines the protecting level according to extension parameter flag bit, the protecting level meets the preset condition if the protecting level is the first level or the second level, and executing step s220; and the protecting level does not meet the preset condition if the protecting level is the third level, and returning an error response to the client and exiting.

For instance, in the case that the extension flag bit is 8 or above, the extension credential-protection needs to be supported, and the protecting level is a highest level of 3 level, which means the user identification (user verification) must be verified, such as fingerprint or iris, and the U2F does not support the user verification, thus the security level is not satisfied, and an error code is returned.

Step s220, performing, by the key device, a preset operation on the user private key intermediate value to obtain and store the user private key.

Optionally, step s220 is specifically that the key device operates an inversion operation on the user private key intermediate value to obtain and store the user private key.

For instance, a XOR operation is performed on the private key and the applet parameter to obtain the private key intermediate value, and the inversion operation means that the XOR operation is performed again on the private key intermediate value and the applet parameter to obtain the private key correct data.

Step s221, obtaining, by the key device, the chipid plaintext stored by the key device, determining whether the chipid plaintext obtained by decrypting key handle is as same as the chipid plaintext stored by the key device, if yes, executing step s222; otherwise, returning an error response to the client and exiting.

Step s222, determining, by the key device, whether the first applet parameter is as same as the second applet parameter, if yes, executing step s223; otherwise, returning an error response to the client, and exiting.

Step s223, prompting, by the key device, the user to confirm, and determining whether the user confirmation is received, if yes, executing step s224; otherwise, returning an error response to the client and exiting.

Step s224, organizing, by the key device, the signature data according to the random parameter and the applet parameter, signing on the signature data by using the user private key to obtain the signature result, generating the authentication response according to the U2F authentication instruction and the signature result, returning the authentication response to the client, and returning to step s201.

Embodiment 3

According to Embodiment 3 of the present application, provided is a method for a key device, as shown in FIGS. 3A-3D, including:

step s301, receiving, by the key device, the U2F authentication instruction sent from the client, and parsing the U2F authentication instruction to obtain the key handle and the applet parameter plaintext.

Step s302, checking, by the key device, whether the key handle is complete by using the changing key of the U2F, if a check is successful, executing step s304; and if the check fails, executing step s303.

Optionally, step s302 specifically includes:
step s302-1, parsing, by the key device, the key handle to obtain the second ciphertext and the first MAC address of the second ciphertext.

Step s302-2, performing, by the key device, the preset operation on the second ciphertext by using the changing key of the U2F according to the preset operation to obtain the second MAC address of the second ciphertext, determining whether the first MAC address of the second ciphertext is as same as the second MAC address of the second ciphertext, if yes, checking that the key handle is complete, and executing step s304; otherwise, checking that the key handle is not complete, and executing step s303.

Specifically, when the key handle is checked to be complete, the register type and the authentication type are the same; and when the key handle is checked to be not complete, the register type and the authentication type are different from each other.

For instance, the preset operation is the Signature X.ALG_AES_CMAC16 operation.

Step s303, checking, by the key device, whether the key handle is complete by using the changing key corresponding to the FIDO2, if a check is successful, executing step s304; and if the check fails, returning an error response to the client and exiting.

Optionally, step s303 specifically includes:
step s303-1, parsing, by the key device, the key handle to obtain the second ciphertext and the first MAC address of the second ciphertext.

Step s303-2, performing, by the key device, the operation on the second ciphertext by using the changing key corresponding to the FIDO2 according to the preset operation to obtain the second MAC address of the second ciphertext, determining whether the first MAC address of the second ciphertext is as same as the second MAC address of the second ciphertext, if yes, checking that the key handle is complete, executing step s304; otherwise, checking that the key handle is not complete, returning an error response to the client, and exiting.

Step s304, decrypting, by the key device the second ciphertext by using the first key to obtain the user private key intermediate value, the applet parameter plaintext and the chip identification plaintext.

Specifically, the second ciphertext is the ciphertext obtained by encrypting the user private key intermediate value, the applet parameter plaintext and the chipid plaintext.

Optionally, step s304 is specifically that the key device decrypts the second ciphertext by using the AES decrypting key corresponding to U2F to obtain the user private key intermediate value, the applet parameter plaintext, and the chip identification plaintext.

Step s305, determining, by the key device, whether the protecting level of the key handle meets the preset condition according to the data value of appointed bit of the key handle, if yes, executing step s306; otherwise, returning an error response to the client, and exiting.

Optionally, the determining, by the key device, whether the protecting level of the key handle meets the preset condition according to the data value of appointed bit of the key handle in step s305 is specifically that the key device determines the protecting level of key handle according to the data value of appointed bit, if the protecting level is the first level or the second level, the protecting level meets the preset condition; and if the protecting level is the third level, the protecting level does not meet the preset condition.

Step s306, performing, by the key device, an inversion operation on the user private key intermediate value to obtain the user private key.

Step s307, determining, by the key device, whether the obtained chip identification plaintext is as same as the chip identification plaintext stored in the key device, if yes, executing step s308; otherwise, the authentication fails, returning an error response to the client, and exiting.

Step s308, determining, by the key device, whether the applet parameter plaintext obtained by parsing the second ciphertext is as same as the applet parameter plaintext obtained from the U2F authentication instruction, if yes, executing step s309; otherwise, the authentication fails, returning an error response to the client, and exiting.

Step s309, prompting, by the key device, the user to confirm, determining whether the confirmation information is received from the user, if yes, executing step s310; otherwise, returning an error response to the client, and exiting.

Optionally, step s309 is specifically that the key device prompts the user to confirm by pressing a key, determines whether key-pressing-confirmation is received from the user, if yes, executes step s310; otherwise, the authentication fails, returns an error response to the client, and exits.

Step s310, organizing, by the key device, the signature data, signing on the signature data by using the user private key to obtain the signature result, organizing the authentication response according to the U2F authentication instruction and the signature result, returning the authentication response to the client, and ending.

Embodiment 4

According to Embodiment 4 of the present application, provided is a working method for a key device, as shown in FIGS. 4A-4D, including:

step s401, receiving, by the key device, an FIDO2 authentication instruction sent from a client, parsing a received FIDO2 authentication instruction to obtain an allow list, a relying party identification and a client parameter plaintext.

Step s402, parsing, by the key device, the allow list to obtain a current credential, determining a length of the current credential, and looking up a match credential from the key device according to the relying party identification and executing step s410 if the length of the current credential is the first preset value; and executing step s403 if the length of the allow list is the second preset value.

Optionally, step s402 is specifically that the key device parses the allow list to obtain the current credential, determines the length of the current credential, if the length is 32 bytes, looks up the match credential from the key device according to the relying party identification, and executes step s410; and if the length is 96 bytes, executes step s403.

Optionally, when the length of the current credential is 32 bytes, the credential is the credential which is registered via a FIDO2 when the resident key (resident key, rk) is true, the key device here stores related information of the user registration, and the corresponding credential information can be found via the relying party (relying party, rp) identification input when performing the authentication; and in the case that the length of the current credential is 96 bytes, the credential may be from the FIDO2 registration or the U2F registration, and executes step s403.

Step s403, checking, by the key device, whether the current credential is complete by using the changing key corresponding to the FIDO2, if a check is successful, executing step s405; and if the check fails, executing step s404.

Optionally, step s403 specifically includes:

step s403-1, parsing, by the key device, the current credential to obtain the first ciphertext and the first MAC value of the first ciphertext.

Where the first ciphertext includes the ciphertext obtained by encrypting the private key intermediate value of 32 bytes, the client parameter of 32 bytes and the chipid of 16 bytes.

Step s403-2, performing, by the key device, the operation on the first ciphertext by using the changing key corresponding to the FIDO2 according to the preset operation to obtain the second MAC value, and determining whether the second MAC value is as same as the first MAC value, if yes, checking that the current credential is complete, and executing step s405; otherwise, checking that the current credential is not complete, and executing step s404.

Specifically, if the current credential is checked to be complete, the registration type is as same as the authentication type; and if the current credential is checked to be not complete, the registration type is different from the authentication type.

For instance, the preset operation is the SignatureX.ALG_AES_CMAC16 operation.

Step s404, checking, by the key device, whether the current credential is complete by using the changing key corresponding to the U2F, if a check is successful, executing step s405; and if the check fails, returning an error response to the client, and exiting.

Optionally, the key device checking whether the current credential is complete by using the changing key corresponding to the U2F specifically includes:

step s404-1, parsing, by the key device, the current credential to obtain the first ciphertext and the first MAC value of the first ciphertext; and step s404-2, performing, by the key device, the operation on the first ciphertext by using the changing key corresponding to the U2F according to the preset operation to obtain the second MAC value, determining whether the first MAC value is same as the second MAC value, if yes, checking that the current credential is complete, and executing step s405; otherwise, checking that the current credential is not complete, returning an error response to the client, and exiting.

Step s405, decrypting, by the key device, the first ciphertext by using the first key to obtain the user private key intermediate value, the client parameter plaintext, and the chipid plaintext.

Optionally, step s405 is specifically that the key device decrypts the first ciphertext by using the AES decrypting key corresponding to the FIDO2 to obtain the user private key intermediate value (NONCE), the client parameter plaintext, and the chip identification plaintext.

Step s406, performing, by the key device, an inversion operation on the user private key intermediate value to obtain and store the user private key.

Optionally, the key device performing the inversion operation on the user private key intermediate value is specifically that:

the key device performs high and low cross operation on the user private key intermediate value and the client parameter to obtain and store the user private key.

Step s407, determining, by the key device, whether the obtained chip identification plaintext is as same as the chipid plaintext stored by the key device, if yes, executing step s408; otherwise, returning an error response to the client, and exiting.

Step s408, determining, by the key device, whether the client parameter plaintext obtained by parsing the first ciphertext is as same as the client parameter plaintext obtained by parsing the FIDO2 authentication instruction, if yes, executing step s409; otherwise, returning an error response to the client, and exiting.

Step s409, storing, by the key device, the relying party identification and the current credential correspondingly.

Step 410, prompting, by the key device, the user to confirm, waiting for the user to receive confirmation information, determining whether the confirmation information from the user is received, if yes, executing step s411; otherwise, returning an error response to the client, and exiting.

Optionally, when the key device does not receive the confirmation information from the user, the method further includes: the key device determines whether the time is out, if yes, the current credential fails, the error response is returned to the client, and exits; otherwise, continues to wait for receiving confirmation information from the user.

Step s411, organizing, the key device, the signature data, signing on the signature data by using the user private key to obtain the signature result, obtaining the authentication response according to the FIDO2 authentication instruction and the signature result, returning the authentication response to the client, and ending.

Embodiment 5

Figure 5:
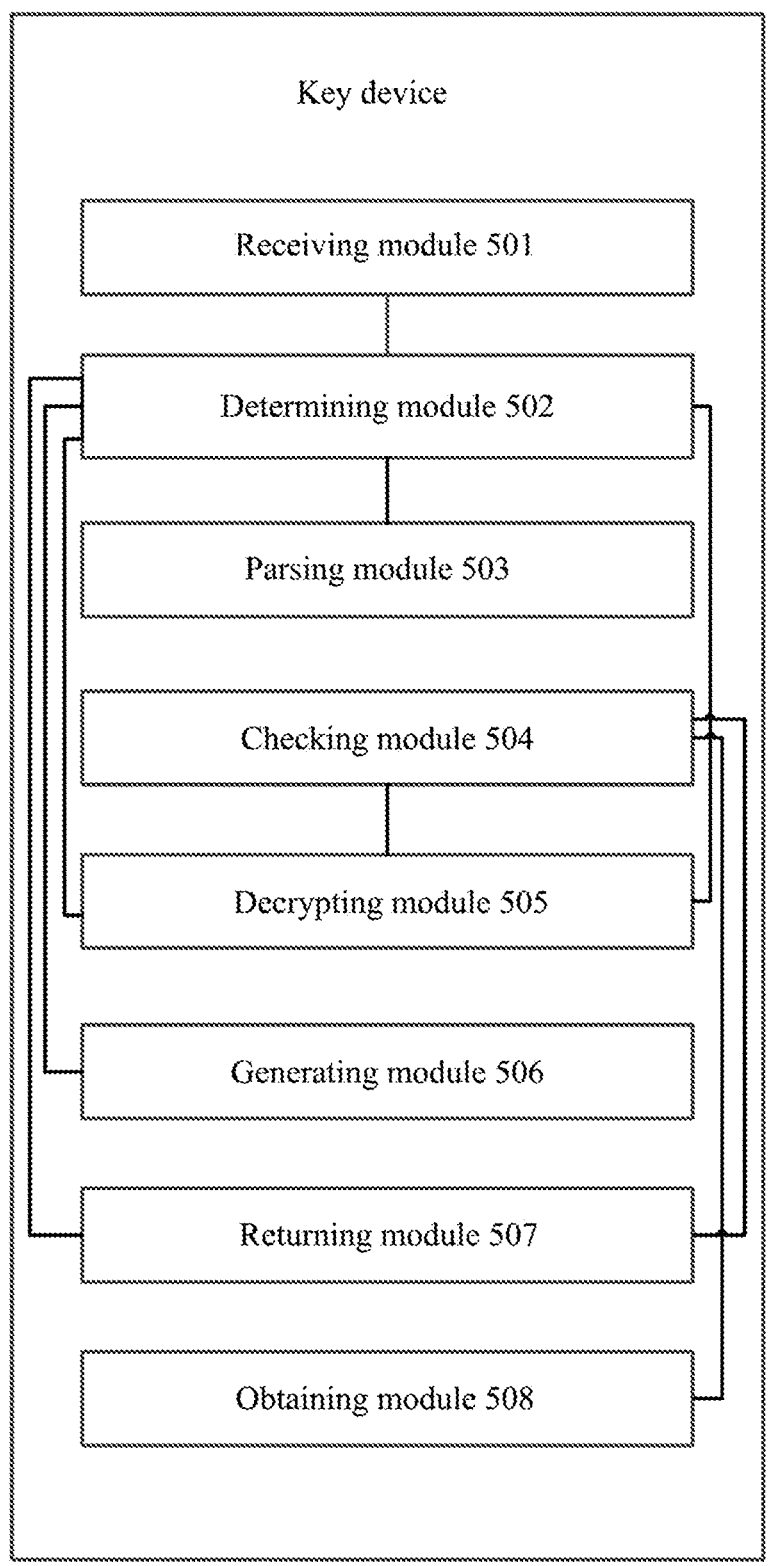
FIG. 5 is a module block diagram of a key device according to Embodiment 5 of the present application.

According to Embodiment 5 of the present application, provided is a key device, as shown in FIG. 5, including:

a receiving module 501, configured to receive an authentication instruction.

A determining module 502, configured to determine a type of the authentication instruction when the receiving module 501 receives the authentication instruction.

A parsing module 503, configured to parse the FIDO2 authentication instruction to obtain a current credential when the determining module 502 determines that the authentication instruction is the FIDO2 authentication instruction.

A checking module 504, configured to obtain a changing key, which is stored by the key device, corresponding to the FIDO2, and check whether the current credential which is obtained through the parsing module parsing the FIDO2 authentication instruction is complete according to the changing key corresponding to the FIDO2.

A decrypting module 505, configured to decrypt the current credential by using the decrypting key corresponding to the FIDO2 to obtain a user private key and a preset flag bit when the checking module 504 checks the current credential is complete.

The determining module 502 is further configured to determine whether a protecting level of the current credential meets a preset condition according to the preset flag bit obtained by the decrypting module 505, when yes, trigger a generating module 506; otherwise, trigger a returning module 507.

The returning module 507 is configured to return an error response to a client when the determining module 502 determines that the protecting level of the current credential does not meet the preset condition.

An obtaining module 508, configured to obtain a changing key, which is stored by the key device, corresponding to a U2F.

The checking module 504 is further configured to check whether the current credential is complete according to a changing key corresponding to the U2F when the obtaining module 508 obtains the changing key corresponding to the U2F; trigger the decrypting module 505 when a check is successful; and trigger the returning module 507 when the check fails.

The returning module 507 is further configured to return an error response to the client when the checking module 504 checks the current credential is not complete according to the changing key corresponding to the U2F.

The decrypting module 505 is further configured to decrypt the current credential by using the decrypting key corresponding to the U2F to obtain the user private key and the preset flag bit when the checking module 504 checks that the current credential is complete according to the changing key corresponding to the U2F.

The determining module 502 is further configured to determine whether the protecting level of the current credential meets the preset condition according to the preset flag bit which is obtained through the decrypting module 505 decrypting the current credential by using the decrypting key corresponding to the U2F, when yes, trigger the generating module 506; otherwise, trigger the returning module 507.

The generating module 506, configured to generate an authentication response according to the current credential, the private key and the FIDO2 authentication instruction, and trigger the returning module 507.

The returning module 507 is further configured to return the authentication response generated by the generating module 506 to the client.

The parsing module 503 is further configured to parse the U2F authentication instruction to obtain a key handle.

The obtaining module 508 is further configured to obtain the changing key, which is stored by the key device, corresponding to the U2F.

The checking module 504 is further configured to check whether the key handle is complete according to the changing key, which is stored by the key device and obtained by the obtaining module 508, corresponding to the U2F, when a check is successful, trigger the decrypting module 505; and when the check fails, trigger the obtaining module 508.

The decrypting module 505 is further configured to decrypt the key handle by using the decrypting key corresponding to the U2F to obtain the user private key and trigger the generating module.

The obtaining module 508 is further configured to obtain the changing key, which is stored by the key device, corresponding to the FIDO2.

The checking module 504 is further configured to check whether the key handle is complete according to the changing key, which is obtained by the obtaining module 508 and stored by the key device, corresponding to the FIDO2, when a check is successful, trigger the decrypting module 505; when the check fails, trigger the returning module 507.

The decrypting module 505 is further configured to decrypt the key handle by using the decrypting key corresponding to the FIDO2 to obtain the user private key and the preset flag bit.

The determining module 502 is further configured to determine whether the protecting level of the key handle meets the preset condition according to the preset flag which is obtained by the decrypting module decrypting the key handle by using the decrypting key corresponding to the FIDO2, when yes, trigger the generating module 506; otherwise, trigger the returning module 507.

The generating module 506 is further configured to generate the authentication response according to the U2F authentication instruction and the user private key.

Optionally, the decrypting module 505 is specifically configured to parse FIDO2 authentication instruction to obtain an allow list, a relaying party identification, and a client parameter; and is further configured to parse the allow list to obtain the current credential.

Optionally, the key device further includes an operating module.

The decrypting module 505 is configured to decrypt the current credential by using the decrypting key corresponding to the FIDO2 to obtain the user private key and the preset flag bit when the checking module 504 checks the current credential is complete; specifically, the decrypting module uses the decrypting key corresponding to the FIDO2 to decrypt the current credential to obtain a user private key intermediate value, a chip identification plaintext, a relying party hash result and an extension parameter flag bit.

The determining module 502 is configured to determine whether the protecting level of the current credential meets the preset condition according to the preset flag bit obtained by the decrypting module 505; when yes, trigger the operating module; otherwise, trigger the returning module 507; specifically, the determining module 502 determines whether the protecting level of the current credential meets the preset condition according to the extension parameter flag bit obtained by the decrypting module 505, when yes, trigger the operating module; otherwise, trigger the returning module 507.

The operating module is configured to perform a preset operation on the private key intermediate value to obtain the user private key.

Optionally, the operating module is specifically configured to perform an inversion operation on the user private key intermediate value to obtain the user private key.

Optionally, the key device further includes an operating module.

The decrypting module 505 is further configured to decrypt the current credential to obtain the user private key and the preset flag bit by using the decrypting key corresponding to the U2F when the checking module 504 checks the current credential is complete according to the changing key corresponding to the U2F, and specifically configured to decrypt the current credential by using the decrypting key corresponding to the U2F to obtain a user private key intermediate value, a chip identification plaintext, a relying party identification hash and an extension parameter flag bit.

The determining module 502 is further specifically configured to determine whether the protecting level of the current credential meets the preset condition according to the extension parameter flag bit obtained by the decrypting module 505, when yes, trigger the operating module; otherwise, trigger the returning module 507.

The returning module 507 is configured to return an error response to the client when the determining module 502 determines that the protecting level of the current credential does not meet the preset condition.

The operating module is further configured to perform a preset operation on the private key intermediate value to obtain the user private key.

Optionally, the operating module is specifically configured to perform an inversion operation on the private key intermediate value to obtain the user private key.

Optionally, the key device further includes an operating module.

Optionally, the decrypting module 505 is further configured to decrypt the key handle by using the decrypting key corresponding to the U2F to obtain the user private key, and specifically configured to decrypt the key handle by using the decrypting key corresponding to the U2F to obtain a user private key intermediate value, a chip identification plaintext and a second applet parameter.

The operating module is further configured to perform a preset operation on the private key intermediate value to obtain the user private key, and trigger the generating module 506.

Optionally, the operating module is specifically configured to perform an inversion operation on the user private key intermediate value to obtain the user private key.

Optionally, the generating module 506 is further configured to generate the authentication response according to the U2F authentication instruction and the user private key; specifically, organize signature data according to a random parameter and an applet parameter, sign on the signature data by using the user private key to obtain a signature result, generate the authentication response according to the signature result and the U2F authentication instruction, and trigger the returning module 507.

The returning module 507 is further configured to return the authentication response to the client when the generating module 506 generates the authentication response.

Embodiment 6

Figure 6:
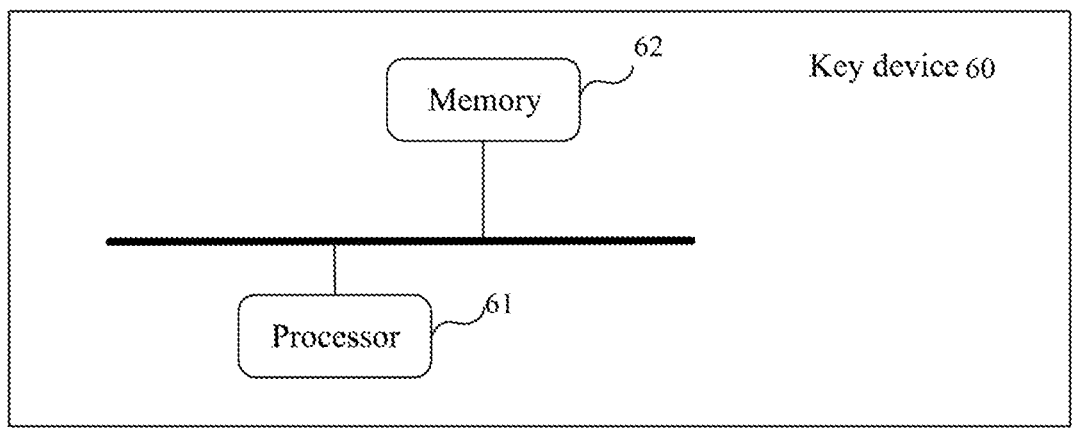
FIG. 6 is a structural block diagram of another key device according to Embodiment 6 of the present application.

According to Embodiment 6 of the present application, provided is a key device 60, as shown in FIG. 6, including:
a processor 61 and a memory 62.

Where the memory 62 is configured to store a program code.

The process 61 is configured to invoke the program code stored in the memory to execute the working method for the key device according to any embodiment of the present application.

In an exemplary embodiment, further provided is a non-temporary computer readable storage medium including an instruction, for instance, a memory including an instruction 62, the above instruction can be executed by the processor 61 of the key device 60 to achieve the above working method for the key device. For instance, the non-temporary computer readable storage medium may be a read only memory (ROM), a random access memory (RAM), a compact disc read only memory (CD-ROM), a tape, a soft disk and photometric data storage device, etc.

A non-temporary computer readable storage medium, where an instruction in the storage medium, when executed by the processor of the key device, enables the key device to execute the above working method for the key device.

The invention claimed is:

1. A working method for a key device, comprising:
    step s1, waiting, by the key device, for receiving an authentication instruction, determining a type of the authentication instruction when receiving the authentication instruction, executing step s2 when the authentication instruction is a fast identity online 2 (FIDO2) authentication instruction, and executing step s7 when the authentication instruction is a universal $2^{nd}$ factor (U2F) authentication instruction;
    step s2, parsing, by the key device, the FIDO2 authentication instruction to obtain a current credential, obtaining a changing key, which is stored in the key device, corresponding to a FIDO2, checking whether the current credential is complete according to the changing key corresponding to the FIDO2, when a check is successful, the current credential is registered in a FIDO2 mode and executing step s3; otherwise, executing step s4;

step s3, decrypting, by the key device, the current credential by using a decrypting key corresponding to the FIDO2 to obtain a user private key and a preset flag bit, determining whether a protecting level of the current credential meets a preset condition according to the preset flag bit, when yes, executing step s6; otherwise, returning an error response to a client and exiting;

step s4, obtaining, by the key device, a changing key, which is stored by the key device, corresponding to the U2F, checking whether the current credential is complete according to the changing key corresponding to the U2F, the current credential is registered by using U2F registration mode and executing step s5 when a check is successful; and returning an error response to the client and exiting when the check fails;

step s5, decrypting, by the key device, the current credential by using a decrypting key corresponding to the U2F to obtain a user private key and a preset flag bit, determining whether the protecting level of the current credential meets the preset condition according to the preset flag bit, when yes, executing step s6; otherwise, returning an error response to the client and exiting;

step s6, generating, by the key device, an authentication response according to the current credential, the user private key and the FIDO2 authentication instruction, returning the authentication response to the client, and returning to step s1;

step s7, parsing, by the key device, the U2F authentication instruction to obtain a key handle, obtaining the changing key, which is stored by the key device, corresponding to the U2F, checking whether the key handle is complete according to the changing key corresponding to the U2F, the key handle is registered by using a U2F mode and executing step s8 when a check is successful; executing step s9 when the check fails;

step s8, decrypting, by the key device, the key handle by using the decrypting key corresponding to the U2F to obtain the user private key, and executing step s11;

step s9, obtaining, by the key device, the changing key, which is stored by the key device, corresponding to the FIDO2, checking whether the key handle is complete according to the changing key corresponding to the FIDO2, when a check is successful, the key handle is registered by using a FIDO2 mode, and executing step s10; when a check fails, returning an error response to the client and exiting;

step s10, decrypting, by the key device, the key handle by using the decrypting key corresponding to the FIDO2 to obtain the user private key and the preset flag bit, determining whether a protecting level of the key handle meets the preset condition according to the preset flag bit, when yes, executing step s11; otherwise, returning an error response to the client and exiting; and step s11, generating, by the key device, the authentication response according to the U2F authentication instruction and the user private key, returning the authentication response to the client, and returning to step s1.

2. The method according to claim 1, wherein the parsing, by the key device, the FIDO2 authentication instruction to obtain the current credential in step s2 is: parsing, by the key device, the FIDO2 authentication instruction to obtain an allow list, a relying party identification, and a client parameter; and parsing the permit name list to obtain the current credential.

3. The method according to claim 1, wherein step s3 comprises:

step s3-1, decrypting, by the key device, the current credential by using the decrypting key corresponding to the FIDO2 to obtain a user private key intermediate value, a chip identification plaintext, a relying party hash result plaintext and an extension parameter flag bit;

step s3-2, determining, by the key device, whether the protecting level of the current credential meets the preset condition according to the extension parameter flag bit, when yes, executing step s3-3; otherwise, returning an error response to the client and exiting; and step s3-3, performing, by the key device, a preset operation on the user private key intermediate value to obtain the user private key, and executing step s6.

4. The method according to claim 3, wherein the preset operation in step s3-3 is an inversion operation.

5. The method according to claim 1, wherein step s5 comprises:

step s5-1, decrypting, by the key device, the current credential by using the decrypting key corresponding to the U2F to obtain a user private key intermediate value, a chip identification plaintext, a relying party identification hash and an extension parameter flag bit;

step s5-2, determining, by the key device, whether the protecting level of the current credential meets the preset condition according to the extension parameter flag bit, when yes, executing step s5-3; otherwise, returning an error response to the client and exiting; and step s5-3, performing, by the key device, a preset operation on the user private key intermediate value to obtain the user private key.

6. The method according to claim 5, wherein the preset operation in step s5-3 is an inversion operation.

7. The method according to claim 1, wherein step s8 comprises:

step s8-1, decrypting, by the key device, the key handle by using the decrypting key corresponding to the U2F to obtain a user private key intermediate value, a chip identification plaintext and a second applet parameter; and step s8-2, performing, by the key device, the preset operation on the user private key intermediate value to obtain the user private key, and executing step s11.

8. The method according to claim 7, wherein the preset operation in step s8-2 is an inversion operation.

9. The method according to claim 1, wherein step s11 comprises:

organizing, by the key device, signature data according to a random parameter and an applet parameter, signing on the signature data by using the user private key to obtain a signature result, and generating the authentication response according to the signature result and the U2F authentication instruction, and returning the authentication response to the client.

10. A key device, comprising:

a processor and a memory; wherein the memory is configured to store a program code; and the processor is configured to invoke the program code stored in the memory to execute the following steps:

step s1, waiting, by the key device, for receiving an authentication instruction, determining a type of the authentication instruction when receiving the authentication instruction, executing step s2 when the authentication instruction is a fast identity online 2 (FIDO2) authentication instruction, and executing step s7 when the authentication instruction is a universal 2nd factor (U2F) authentication instruction;

step s2, parsing, by the key device, the FIDO2 authentication instruction to obtain a current credential, obtaining a changing key, which is stored in the key device, corresponding to a FIDO2, checking whether the current credential is complete according to the changing key corresponding to the FIDO2, when a check is successful, the current credential is registered in a FIDO2 mode and executing step s3; otherwise, executing step s4;

step s3, decrypting, by the key device, the current credential by using a decrypting key corresponding to the FIDO2 to obtain a user private key and a preset flag bit, determining whether a protecting level of the current credential meets a preset condition according to the preset flag bit, when yes, executing step s6; otherwise, returning an error response to a client and exiting;

step s4, obtaining, by the key device, a changing key, which is stored by the key device, corresponding to the U2F, checking whether the current credential is complete according to the changing key corresponding to the U2F, the current credential is registered by using U2F registration mode and executing step s5 when a check is successful; and returning an error response to the client and exiting when the check fails;

step s5, decrypting, by the key device, the current credential by using a decrypting key corresponding to the U2F to obtain a user private key and a preset flag bit, determining whether the protecting level of the current credential meets the preset condition according to the preset flag bit, when yes, executing step s6; otherwise, returning an error response to the client and exiting;

step s6, generating, by the key device, an authentication response according to the current credential, the user private key and the FIDO2 authentication instruction, returning the authentication response to the client, and returning to step s1;

step s7, parsing, by the key device, the U2F authentication instruction to obtain a key handle, obtaining the changing key, which is stored by the key device, corresponding to the U2F, checking whether the key handle is complete according to the changing key corresponding to the U2F, the key handle is registered by using a U2F mode and executing step s8 when a check is successful; executing step s9 when the check fails;

step s8, decrypting, by the key device, the key handle by using the decrypting key corresponding to the U2F to obtain the user private key, and executing step s11;

step s9, obtaining, by the key device, the changing key, which is stored by the key device, corresponding to the FIDO2, checking whether the key handle is complete according to the changing key corresponding to the FIDO2, when a check is successful, the key handle is registered by using a FIDO2 mode, and executing step s10; when a check fails, returning an error response to the client and exiting;

step s10, decrypting, by the key device, the key handle by using the decrypting key corresponding to the FIDO2 to obtain the user private key and the preset flag bit, determining whether a protecting level of the key handle meets the preset condition according to the preset flag bit, when yes, executing step s11; otherwise, returning an error response to the client and exiting; and step s11, generating, by the key device, the authentication response according to the U2F authentication instruction and the user private key, returning the authentication response to the client, and returning to step s1.

11. The key device according to claim 10, wherein the processor is configured to parse the FIDO2 authentication instruction to obtain a white list, a relying party identification, and a client parameter; and further configured to parse the white list to obtain the current credential.

12. The key device according to claim 10, wherein processor is further configured to invoke the program code stored in the memory to execute the following steps:

step s3-1, decrypting, by the key device, the current credential by using the decrypting key corresponding to the FIDO2 to obtain a user private key intermediate value, a chip identification plaintext, a relying party hash result plaintext and an extension parameter flag bit;

step s3-2, determining, by the key device, whether the protecting level of the current credential meets the preset condition according to the extension parameter flag bit, when yes, executing step s3-3; otherwise, returning an error response to the client and exiting; and step s3-3, performing, by the key device, a preset operation on the user private key intermediate value to obtain the user private key, and executing step.

13. The key device according to claim 12, wherein the processor is configured to perform an inversion operation on the user private key intermediate value to obtain the user private key.

14. The key device according to claim 10, wherein the processor is further configured to invoke the program code stored in the memory to execute the following steps:

step s5-1, decrypting, by the key device, the current credential by using the decrypting key corresponding to the U2F to obtain a user private key intermediate value, a chip identification plaintext, a relying party identification hash and an extension parameter flag bit;

step s5-2, determining, by the key device, whether the protecting level of the current credential meets the preset condition according to the extension parameter flag bit, when yes, executing step s5-3; otherwise, returning an error response to the client and exiting; and step s5-3, performing, by the key device, a preset operation on the user private key intermediate value to obtain the user private.

15. The key device according to claim 14, wherein the processor is configured to perform an inversion operation on the private key intermediate value to obtain the user private key.

16. The key device according to claim 10, wherein the processor is further configured to invoke the program code stored in the memory to execute the following steps:

step s8-1, decrypting, by the key device, the key handle by using the decrypting key corresponding to the U2F to obtain a user private key intermediate value, a chip identification plaintext and a second applet parameter; and step s8-2, performing, by the key device, the preset operation on the user private key intermediate value to obtain the user private key, and executing step s11.

17. The key device according to claim 16, wherein the processor is configured to perform an inversion operation on the user private key intermediate value to obtain the user private key.

18. The key device according to claim 10, wherein the processor is further configured to generate the authentication response according to the U2F authentication instruction and the user private key and organize signature data according to a random parameter and an applet parameter, sign on the signature data by using the user private key to obtain a signature result, generate the authentication response according to the signature result and the U2F authentication instruction; and return the authentication response to the client when the generates the authentication response.

19. A non-transitory computer readable storage medium, wherein instructions are stored in the computer readable storage medium, and the instructions, when running on a computer, cause the computer to execute the following steps:

step s1, waiting for receiving an authentication instruction, determining a type of the authentication instruction when receiving the authentication instruction, executing step s2 when the authentication instruction is a fast identity online 2 (FIDO2) authentication instruction, and executing step s7 when the authentication instruction is a universal $2^{nd}$ factor (U2F) authentication instruction;

step s2, parsing the FIDO2 authentication instruction to obtain a current credential, obtaining a changing key, which is stored in the key device, corresponding to a FIDO2, checking whether the current credential is complete according to the changing key corresponding to the FIDO2, when a check is successful, the current credential is registered in a FIDO2 mode and executing step s3; otherwise, executing step s4;

step s3, decrypting the current credential by using a decrypting key corresponding to the FIDO2 to obtain a user private key and a preset flag bit, determining whether a protecting level of the current credential meets a preset condition according to the preset flag bit, when yes, executing step s6; otherwise, returning an error response to a client and exiting;

step s4, obtaining a changing key, which is stored by the key device, corresponding to the U2F, checking whether the current credential is complete according to the changing key corresponding to the U2F, the current credential is registered by using U2F registration mode and executing step s5 when a check is successful; and returning an error response to the client and exiting when the check fails;

step s5, decrypting the current credential by using a decrypting key corresponding to the U2F to obtain a user private key and a preset flag bit, determining whether the protecting level of the current credential meets the preset condition according to the preset flag bit, when yes, executing step s6; otherwise, returning an error response to the client and exiting;

step s6, generating an authentication response according to the current credential, the user private key and the FIDO2 authentication instruction, returning the authentication response to the client, and returning to step s1;

step s7, parsing the U2F authentication instruction to obtain a key handle, obtaining the changing key, which is stored by the key device, corresponding to the U2F, checking whether the key handle is complete according to the changing key corresponding to the U2F, the key handle is registered by using a U2F mode and executing step s8 when a check is successful; executing step s9 when the check fails;

step s8, decrypting the key handle by using the decrypting key corresponding to the U2F to obtain the user private key, and executing step s11;

step s9, obtaining the changing key, which is stored by the key device, corresponding to the FIDO2, checking whether the key handle is complete according to the changing key corresponding to the FIDO2, when a check is successful, the key handle is registered by using a FIDO2 mode, and executing step s10; when a check fails, returning an error response to the client and exiting;

step s10, decrypting the key handle by using the decrypting key corresponding to the FIDO2 to obtain the user private key and the preset flag bit, determining whether a protecting level of the key handle meets the preset condition according to the preset flag bit, when yes, executing step s11; otherwise, returning an error response to the client and exiting; and step s11, generating the authentication response according to the U2F authentication instruction and the user private key, returning the authentication response to the client, and returning to step s1.

\* \* \* \* \*